US006636395B1

(12) United States Patent
Terunuma

(10) Patent No.: US 6,636,395 B1
(45) Date of Patent: Oct. 21, 2003

(54) MAGNETIC TRANSDUCER AND THIN FILM MAGNETIC HEAD USING THE SAME

(75) Inventor: Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 161 days.

(21) Appl. No.: 09/584,371

(22) Filed: May 31, 2000

(30) Foreign Application Priority Data

Jun. 3, 1999 (JP) .......................................... 11-156751
Jun. 10, 1999 (JP) .......................................... 11-163354

(51) Int. Cl.$^7$ ............................. G11B 5/127; G11B 5/33
(52) U.S. Cl. ............................. 360/324.11; 360/324.12
(58) Field of Search .................... 360/324.11, 324.12

(56) References Cited

U.S. PATENT DOCUMENTS

| | | | |
|---|---|---|---|
| 5,696,656 A | * 12/1997 | Gill et al. .................... 360/319 |
| 5,867,025 A | * 2/1999 | Allenspach et al. ........ 324/252 |
| 5,966,273 A | 10/1999 | Matsumoto et al. ........ 360/113 |
| 5,978,184 A | * 11/1999 | Terunuma .................... 360/327 |
| 6,153,319 A | * 11/2000 | Hasegawa .................... 324/252 |
| 6,178,071 B1 | * 1/2001 | Hasegawa et al. ..... 360/324.11 |
| 6,381,107 B1 | * 4/2002 | Redon et al. ................ 360/319 |
| 6,433,969 B1 | * 8/2002 | Nagahara .................... 360/317 |

FOREIGN PATENT DOCUMENTS

JP A 6-223331 8/1994
JP A 10-222816 8/1998

* cited by examiner

Primary Examiner—David Davis
(74) Attorney, Agent, or Firm—Oliff & Berridge, PLC.

(57) ABSTRACT

Provided are a magnetic transducer, a thin film magnetic head and a method of manufacturing the same which can improve efficiency of heat dissipation.

An MR element functioning as a magnetic transducer including: a nonmagnetic metal layer; a free layer formed on one surface of the nonmagnetic metal layer; a pinned layer formed on the other surface of the nonmagnetic metal layer; and an antiferromagnetic layer formed on a surface of the pinned layer, the surface being opposite to a surface in contact with the nonmagnetic metal layer. One end face of the free layer, the nonmagnetic metal layer, the pinned layer and the antiferromagnetic layer forms a medium facing surface forming a surface facing an external magnetic field. A tapered surface inclined to the medium facing surface is formed on the end face opposite to the medium facing surface of a stack comprising the free layer, the nonmagnetic metal layer, the pinned layer and the antiferromagnetic layer. A distance between the medium facing surface of the antiferromagnetic layer and the opposite face is longer than a distance between the medium facing surface of the free layer and the opposite face. Thus, a sufficient amount of heat dissipation from the antiferromagnetic layer can be ensured. Therefore, heating of the magnetic transducer can be prevented.

11 Claims, 28 Drawing Sheets

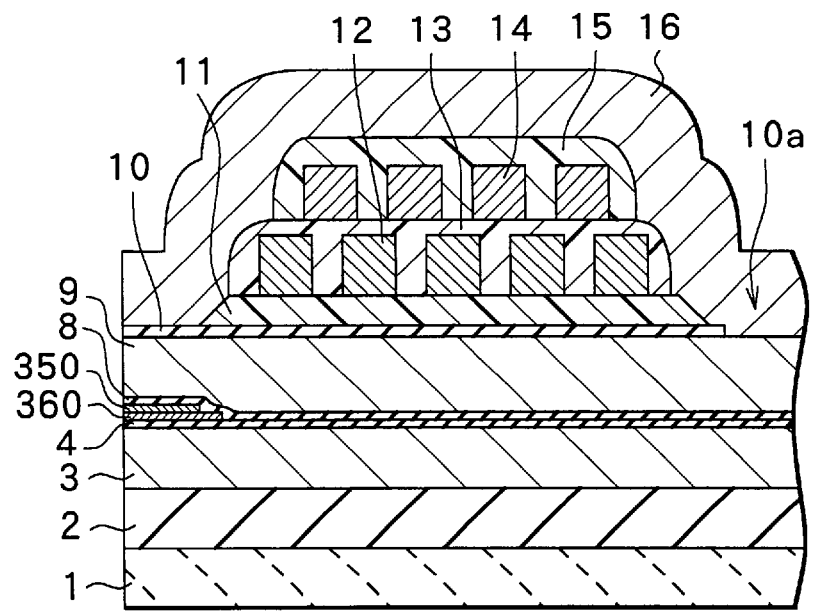
FIG. 33
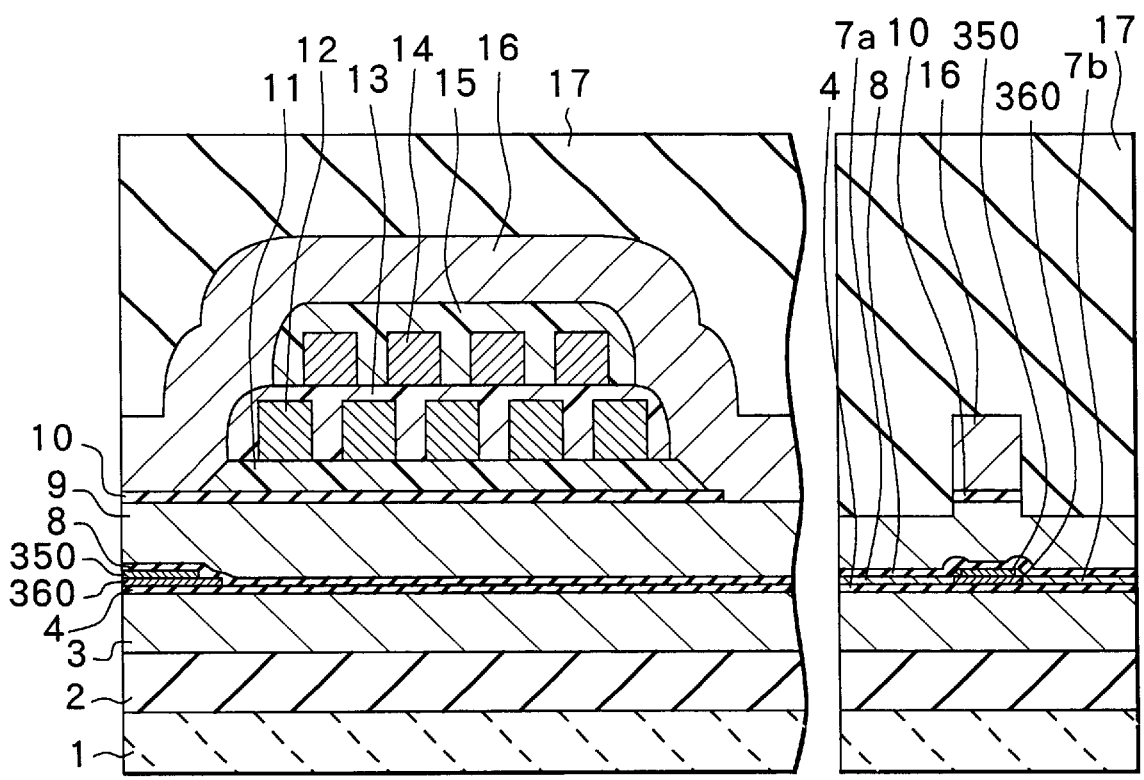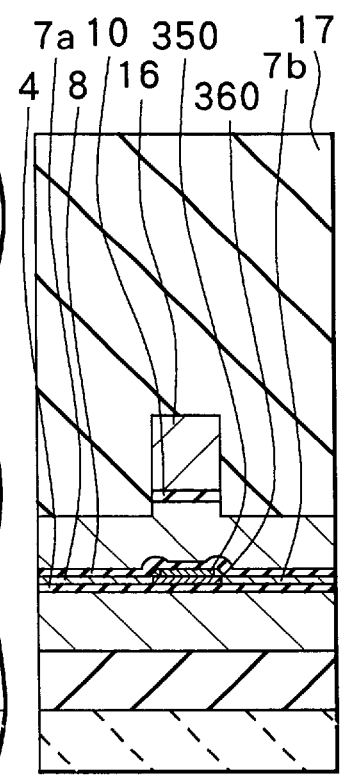
FIG. 34A  FIG. 34B

MAGNETIC TRANSDUCER AND THIN FILM MAGNETIC HEAD USING THE SAME

BACKGROUND OF THE INVENTION

1. Field of the Invention

The invention relates to a magnetic transducer, a thin film magnetic head using the same, and a method of manufacturing the same.

2. Description of the Related Art

Recently, an improvement in performance of a thin film magnetic head has been sought in accordance with an increase in a surface recording density of a hard disk drive. A composite thin film magnetic head, which has a stacked structure comprising a reproducing head having a magnetoresistive element (hereinafter sometimes referred to as an MR element) that is a type of magnetic transducer and a recording head having an inductive magnetic transducer, is widely used as the thin film magnetic head.

MR elements include an AMR element using a magnetic film (an AMR film) exhibiting an anisotropic magnetoresistive effect (an AMR effect), a GMR element using a magnetic film (a GMR film) exhibiting a giant magnetoresistive effect (a GMR effect), and so on.

The reproducing head using the AMR element is called an AMR head or simply an MR head, and the reproducing head using the GMR element is called a GMR head. The AMR head is used as the reproducing head whose surface recording density exceeds 1 gigabit per square inch, and the GMR head is used as the reproducing head whose surface recording density exceeds 3 gigabits per square inch. As the GMR film, a "multilayered type (antiferromagnetic type)" film, an "inductive ferromagnetic type" film, a "granular type" film, a "spin valve type" film and the like are proposed. Of these types of films, the spin valve type GMR film is considered to have a relatively simple structure, to exhibit a great change in resistance even under a low magnetic field and to be suitable for mass production.

FIG. 54 is a sectional side view of a general structure of a composite thin film magnetic head 800 (hereinafter simply referred to as a thin film magnetic head) using an MR element using a spin valve type GMR film (hereinafter referred to as a spin valve film). The thin film magnetic head 800 has a substrate 801 made of, for example, $Al_2O_3$. TiC (altic). A bottom shield layer 803 made of a magnetic material is stacked on the substrate 801 with an insulating layer 802 made of, for example, $Al_2O_3$ (alumina) in between. A bottom shield gap layer 804 and a top shield gap layer 806 made of, for example, $Al_2O_3$ or AlN (aluminum nitride) are stacked on the bottom shield layer 803. A stack 805, which is the above-mentioned spin valve film, is buried between the bottom shield gap layer 804 and the top shield gap layer 806.

A top shield layer 807 (also serving as a bottom pole) made of a magnetic material is formed on the top shield gap layer 806. A top pole layer 810 is located facing the top shield layer 807 with a write gap layer 808 made of, for example, $Al_2O_3$ in between. Thin film coils 811 buried in an insulating layer 809 are formed between the top shield layer 807 and the top pole layer 810. The bottom shield layer 803, the bottom shield gap layer 804, the stack 805 and the top shield gap layer 806 compose a reproducing head for reading out information from a magnetic recording medium. The top shield layer 807, the write gap layer 808, the insulating layer 809, the top pole layer 810 and the thin film coils 811 compose a recording head for writing information on the magnetic recording medium. A surface indicated by reference symbol S in FIG. 54 corresponds to a medium facing surface (an air bearing surface: ABS) of the thin film magnetic head 800 facing the magnetic recording medium such as a hard disk.

The structure of the stack 805 which is the spin valve film will be described with reference to FIGS. 55 and 56. FIG. 55 is a cross sectional view of the stack 805 parallel to the medium facing surface S (i.e., a cross sectional view taken along the line LV—LV of FIG. 54). FIG. 56 is a cross sectional view of the stack 805 perpendicular to the medium facing surface S (i.e., an enlarged view of the stack 805 shown in FIG. 54). The spin valve film is basically composed of a multilayered film having a stacked structure comprising four layers: an antiferromagnetic layer 851 made of, for example, PtMn (platinum-manganese alloy); a pinned layer 852 which is a magnetic layer made of, for example, Co (cobalt); a nonmagnetic metal layer 853 made of, for example, Cu (copper); and a free layer 854 made of, for example, NiFe (permalloy). When heat treatment takes place at, for example, 250 degrees centigrade in a state in which the pinned layer 852 and the antiferromagnetic layer 851 are stacked, the orientation of magnetization of the pinned layer 852 is fixed in, for example, the direction indicated by reference symbol Y in FIG. 56 by an exchange anisotropic magnetic field generated by exchange coupling occurring on an interface between the antiferromagnetic layer 851 and the pinned layer 852. Since the free layer 854 is separated from the antiferromagnetic layer 851 by the nonmagnetic metal layer 853, the orientation of magnetization thereof is not fixed but changes in accordance with an external magnetic field.

Reproduction of information in the MR element using the above-mentioned spin valve film, i.e., detection of a signal magnetic field from the magnetic recording medium is performed in the following manner. First, a sense current, which is a constant direct current, is passed through the pinned layer 852, the nonmagnetic metal layer 853 and the free layer 854 in, for example, the direction indicated by reference symbol X in FIG. 55. On receiving the signal magnetic field from the magnetic recording medium, the orientation of magnetization of the free layer 854 changes. Electrical resistance changes in accordance with a relative angle between the orientation of magnetization of the free layer 854 and the (fixed) orientation of magnetization of the pinned layer 852, and thus information is detected as a voltage change caused by a change in electrical resistance.

Generally, a distance between the medium facing surface S of the MR element and the opposite surface is called an MR height (MR-H). In the case of the MR element using the spin valve film, the MR height is determined in accordance with the distance between the medium facing surface S of the free layer and the opposite face. A read track width Tw of the MR element decreases as a recording density increases. Also, the MR height of the MR element tends to decrease as the read track width decreases. For example, the MR height is equal to 0.6 $\mu$m when the read track width of the MR element is equal to 1 $\mu$m, while the MR height is equal to 0.3 $\mu$m when the read track width of the MR element is equal to 0.5 $\mu$m.

As described above, a size reduction of the MR element advances. However, with the advance in the size reduction, the following problem arises due to heat generated in the MR element. That is, heat generated in the MR element is dissipated into the top and bottom shield layers (the shield layers 803 and 807 shown in FIG. 54) through the top and bottom shield gap layers. However, when the reproducing track width and the MR height of the MR element are reduced, a heat dissipation area of the MR element (i.e., the product of the reproducing track width and the MR height) is considerably reduced. Heat generation by the MR element incident to the reduction in the heat dissipation area becomes a factor that causes electro migration (a phenomenon in which a local void is created because of metal atoms migrating through a conductor) or interlayer diffusion. As a result, a problem exists: the longevity of the MR element decreases.

Japanese Patent Application Laid-open Nos. Hei 6-223331 and 10-222816 disclose a technique in which layers (a shield layer, an insulating layer, a substrate, etc.) around an MR element are made of a material having high thermal conductivity so that heat generated in the MR element is efficiently dissipated. However, when the heat dissipation area of the MR element decreases with the above-mentioned size reduction of the MR element, the improvement in efficiency of heat dissipation cannot be expected much even if the layers around the MR element have high thermal conductivity.

SUMMARY OF THE INVENTION

The invention is designed to overcome the foregoing problems. It is an object of the invention to provide a magnetic transducer, a thin film magnetic head and a method of manufacturing the same which can improve efficiency of heat dissipation.

A magnetic transducer of first aspect of the invention comprises: a nonmagnetic layer; a soft magnetic layer formed adjacent to one surface of the nonmagnetic layer and having the orientation of magnetization freely changing in accordance with an external magnetic field; a ferromagnetic layer formed adjacent to the other surface of the nonmagnetic layer; and an antiferromagnetic layer formed adjacent to a surface of the ferromagnetic layer, the surface being opposite to a surface in contact with the nonmagnetic layer, wherein the soft magnetic layer, the nonmagnetic layer, the ferromagnetic layer and the antiferromagnetic layer are configured so that one end surface thereof forms a surface facing the external magnetic field, and a distance between the one end surface of the antiferromagnetic layer and the opposite surface is longer than at least a distance from the one end face of the soft magnetic layer to the opposite face.

In the magnetic transducer of first aspect of the invention, electrical resistance changes in accordance with a change in the orientation of magnetization of the soft magnetic layer due to the external magnetic field (e.g., a signal magnetic field from a recording medium or the like). Thus, magnetic information is detected in accordance with a voltage change (a read output) incident to the change in resistance. Joule's heat generated by a sense current passing through the magnetic transducer is dissipated through the antiferromagnetic layer having the longer distance between the one end face and the opposite face.

Preferably, a difference between the distance between the one end face of the antiferromagnetic layer and the opposite face and the distance between the one end face of the soft magnetic layer and the opposite surface is from 0.05 $\mu$m to 1.0 $\mu$m inclusive. When the difference between the distances is less than 0.05 $\mu$m, a heat dissipation effect is little improved. When the difference between the distances is more than 1.0 $\mu$m, asymmetry of a plus output and a minus output of the read output increases.

Moreover, the surface opposite to the one end face of the soft magnetic layer, the nonmagnetic layer, the ferromagnetic layer and the antiferromagnetic layer may be inclined to the one end face. The formation of the inclined surface makes it possible to obtain with relative ease the above-described configuration in which the distance between the one end face of the antiferromagnetic layer and the opposite face is longer than at least the distance between the one end face of the soft magnetic layer and the opposite face.

Moreover, the face opposite to the one end face of the soft magnetic layer may be parallel to the one end face, and the surface opposite to the one end face of the nonmagnetic layer, the ferromagnetic layer and the antiferromagnetic layer may be inclined to the one end face. When each end face of the soft magnetic layer is vertical as described above, an MR height can be more precisely determined.

A thin film magnetic head of first aspect of the invention comprises a magnetic transducer including: a nonmagnetic layer; a soft magnetic layer formed adjacent to one surface of the nonmagnetic layer; a ferromagnetic layer formed adjacent to the other surface of the nonmagnetic layer; and an antiferromagnetic layer formed adjacent to a surface of the ferromagnetic layer, the surface being opposite to a surface in contact with the nonmagnetic layer, wherein the soft magnetic layer, the nonmagnetic layer, the ferromagnetic layer and the antiferromagnetic layer are configured so that one end face thereof forms a surface facing a recording medium, and a distance between the one end face of the antiferromagnetic layer and the opposite face is longer than at least a distance from the one end face of the soft magnetic layer and the opposite face.

Preferably, the thin film magnetic head of first aspect of the invention further comprises two magnetic shield layers located so as to face each other with the magnetic transducer in between, for magnetically shielding the magnetic transducer. In this case, Joule's heat generated in a magnetoresistive film is transferred to one magnetic shield layer through the antiferromagnetic layer.

Moreover, the thin film magnetic head of first aspect of the invention may have: two magnetic layers magnetically coupled to each other and each having a recording-medium-facing part including a magnetic pole, the magnetic poles facing each other with a gap layer in between, the magnetic layers being each formed of at least one layer; and thin film coils arranged between the two magnetic layers. A current is passed through the thin film coils, whereby a magnetic field (across the gap layer) is generated at the magnetic poles. Thus, information is written on a magnetic recording medium by the magnetic field.

A method of manufacturing a magnetic transducer of first aspect of the invention comprises the steps of: forming on a substrate a stack including an antiferromagnetic layer, a ferromagnetic layer, a nonmagnetic layer and a soft magnetic layer; and patterning the stack so that a distance between one end face of the antiferromagnetic layer and the opposite face is longer than at least a distance between one end face of the soft magnetic layer (on the side of the one end face of the antiferromagnetic layer) and the opposite face. According to the manufacturing method, obtained is the stack comprising the antiferromagnetic layer, the ferromagnetic layer, the nonmagnetic layer and the soft magnetic layer, which are formed on the substrate in this order.

In the method of manufacturing a magnetic transducer of first aspect of the invention, the antiferromagnetic layer, which has the longer distance between the one end face and the opposite face (than at least the soft magnetic layer), is formed. Joule's heat generated by the current passing through the stack is dissipated through the antiferromagnetic layer.

Preferably, the patterning step uses ion milling. In this case, an angle of inclination of an inclined surface of the stack may be controlled by adjusting at least either an angle of incidence of ions for ion milling or a thickness of a resist mask.

A method of manufacturing a thin film magnetic head of first aspect of the invention comprising a magnetic transducer of the invention comprises: a step of forming the magnetic transducer including the steps of: forming on a substrate a stack including an antiferromagnetic layer, a ferromagnetic layer, a nonmagnetic layer and a soft magnetic layer; and patterning the stack so that a distance between one end face of the antiferromagnetic layer and the opposite face is longer than at least a distance between one end face of the soft magnetic layer (on the side of the one end face of the antiferromagnetic layer) and the opposite face.

Preferably, the method of manufacturing a thin film magnetic head of first aspect of the invention further comprises the steps of: forming a first magnetic shield layer; forming a first shield gap layer on the first magnetic shield layer; forming a magnetic transducer on the first shield gap layer; forming a second shield gap layer on the magnetic transducer; and forming a second magnetic shield layer on the second shield gap layer.

A magnetic transducer of second aspect of the invention comprises: a magneto-sensitive layer for sensing an external magnetic field; and a heat dissipation layer formed adjacent to the magneto-sensitive layer. Magneto-sensitive layers include, for example, a magnetoresistive film whose electrical resistance changes in accordance with the external magnetic field, and the like. Magnetoresistive films include, for example, an AMR film, a GMR film, a TMR film (a tunnel junction type magnetoresistive film), and so on. A state in which the layers are adjacent to each other refers to not only a state in which the layers are in direct contact with each other but also a state in which the layers adjoin each other with another layer in between.

The magnetic transducer of second aspect of the invention, Joule's heat generated by the current passing through the magneto-sensitive layer is transferred by heat transfer or the like to peripheral components of the magnetic transducer through the heat dissipation layer formed adjacent to the magneto-sensitive layer.

Preferably, a thickness of the heat dissipation layer is from 1 nm to 100 nm inclusive. Thus, much heat dissipation effect is obtained, and symmetry of the plus output and the minus output of the output is improved. Moreover, the heat dissipation layer may be made of a nonmagnetic metal film (for example, containing Zr, Bi, Ta, Pt or Pd) having higher resistance than resistance of the magneto-sensitive layer. Since the heat dissipation layer is of high resistance, the sense current passing through the magneto-sensitive layer is prevented from being diverted to the heat dissipation layer. Moreover, a surface area of the heat dissipation layer may be larger than that of the magneto-sensitive layer. The larger the surface area of the heat dissipation layer is, the larger a contact area of the heat dissipation layer and the magneto-sensitive layer and a contact area of the heat dissipation layer and external components (the magnetic shield layers, etc.) are. The larger the contact areas become, the higher the efficiency of heat dissipation becomes. Moreover, a distance between one end face of the heat dissipation layer (the surface facing the external magnetic field) and the opposite face may be longer than a distance between one end face of the magneto-sensitive layer (the surface facing the external magnetic field) and the opposite surface. Moreover, an insulating layer may be provided between the magneto-sensitive layer and the heat dissipation layer. The insulating layer is located between the magneto-sensitive layer and the heat dissipation layer, whereby the sense current passing through the magneto-sensitive layer can be prevented from being diverted to the heat dissipation layer.

Moreover, the magneto-sensitive layer may comprise a magnetoresistive film whose electrical resistance changes in accordance with the external magnetic field. More particularly, the magnetoresistive film may comprise: a nonmagnetic layer; a soft magnetic layer formed adjacent to one surface of the nonmagnetic layer and having the orientation of magnetization freely changing in accordance with the external magnetic field; a ferromagnetic layer formed adjacent to the other surface of the nonmagnetic layer; and an antiferromagnetic layer formed adjacent to a surface of the ferromagnetic layer, the surface being opposite to a surface in contact with the nonmagnetic layer. When the magnetic field from the magnetic recording medium is applied to the soft magnetic layer, the orientation of magnetization of the soft magnetic layer is changed. Thus, electrical resistance changes in response to a relative angle between the changed orientation of magnetization of the soft magnetic layer and the (fixed) orientation of magnetization of the ferromagnetic layer. Consequently, the voltage change incident to the change in electrical resistance is detected. Joule's heat generated by the current passing through the soft magnetic layer, the nonmagnetic layer and the ferromagnetic layer is transferred to the outside through the heat dissipation layer. The heat dissipation layer can be formed adjacent to the antiferromagnetic layer or the soft magnetic layer.

A thin film magnetic head of second aspect of the invention comprising a magnetic transducer, the magnetic transducer has any one of the above-described structures. Preferably, another thin film magnetic head of the invention comprises two magnetic shield layers located so as to face each other with the magnetic transducer in between, for magnetically shielding the magnetic transducer. Thus, Joule's heat generated by the current passing through the magneto-sensitive layer of the magnetic transducer is transferred to one magnetic shield layer through the heat dissipation layer.

Moreover, the thin film magnetic head of second aspect of the invention may have: two magnetic layers magnetically coupled to each other and each having a recording-medium-facing part including a magnetic pole, the magnetic poles facing each other with a gap layer in between, the magnetic layers being each formed of at least one layer; and thin film coils arranged between the two magnetic layers. A current is passed through the thin film coils, whereby the magnetic field is generated at the magnetic poles. Therefore, information can be written on the magnetic recording medium by the magnetic field.

A method of manufacturing a magnetic transducer of second aspect of the invention comprises the step of forming the heat dissipation layer and the magneto-sensitive layer so that the heat dissipation layer and the magneto-sensitive layer are adjacent to each other.

Preferably, the method of manufacturing a magnetic transducer of second aspect of the invention comprises the steps of forming the heat dissipation layer on a base; and forming the magneto-sensitive layer on the heat dissipation layer. According to the manufacturing method, obtained is the magnetic transducer in which the heat dissipation layer and the magneto-sensitive layer are stacked on the substrate in this order. Moreover, another method of manufacturing a magnetic transducer of the invention may further comprise the step of forming another heat dissipation layer on the magneto-sensitive layer (formed on the heat dissipation layer). According to the manufacturing method, obtained is the magnetic transducer in which the heat dissipation layer, the magneto-sensitive layer and another heat dissipation layer are stacked on the substrate in this order. Moreover, another method of manufacturing a magnetic transducer of the invention may comprise the steps of: forming the magneto-sensitive layer on the base; and forming the heat dissipation layer on the magneto-sensitive layer. According to the manufacturing method, obtained is the magnetic transducer in which the magneto-sensitive layer and the heat dissipation layer are stacked on the sputtering, for example.

The method of manufacturing a magnetic transducer of second aspect of the invention may further comprise the step of: forming an insulating layer between the heat dissipation layer and the magneto-sensitive layer. According to the manufacturing method, obtained is the magnetic transducer having a structure in which the insulating layer is interposed between the heat dissipation layer and the magneto-sensitive layer. The insulating layer can be formed by, for example, oxidizing a surface of the heat dissipation layer.

A method of manufacturing a thin film magnetic head of second aspect of the invention, which is a method of manufacturing a thin film magnetic head with a magnetic transducer, comprises a step of forming the magnetic transducer by using any one of the above-described methods of manufacturing a magnetic transducer.

Preferably, the step of forming the magnetic transducer includes the steps of forming a first magnetic shield layer; forming a first shield gap layer on the first magnetic shield layer; forming a magnetic transducer on the first shield gap layer; forming a second shield gap layer on the magnetic transducer; and forming a second magnetic shield layer on the second shield gap layer is performed by using any one of the above-described methods of manufacturing a magnetic transducer.

Other and further objects, features and advantages of the invention will appear more fully from the following description.

BRIEF DESCRIPTION OF THE DRAWINGS

FIG. 33 is a cross sectional view for describing a step following the step of FIG. 32;

FIGS. 34A and 34B are enlarged sectional views for describing a step following the step of FIG. 33;

DETAILED DESCRIPTION OF THE PREFERRED EMBODIMENTS

Embodiments of the invention will be described in detail below with reference to the drawings.

First Embodiment

An MR element functioning as a magnetic transducer according to a first embodiment of the invention and a thin film magnetic head functioning as the thin film magnetic head using the MR element will be described with reference to FIGS. 1 to 16.

<Structures of MR Element and Thin Film Magnetic Head>

Figure 1:
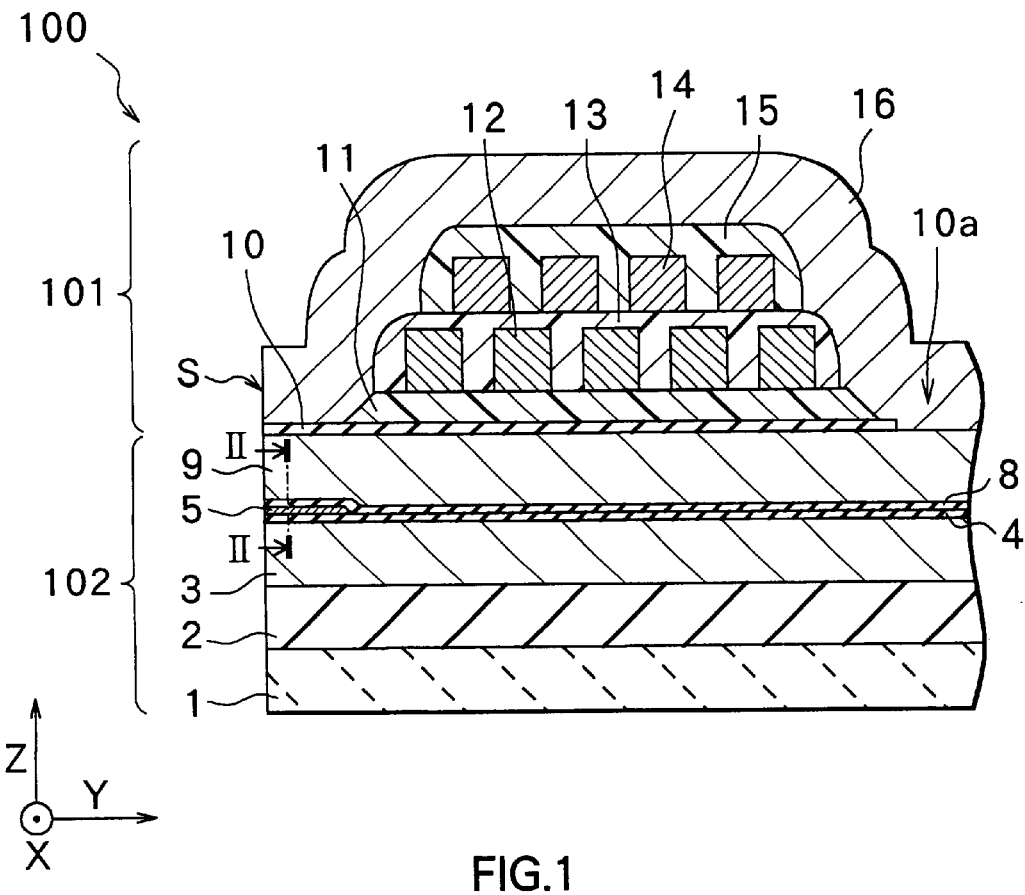
FIG. 1 is a cross sectional view of a thin film magnetic head according to a first embodiment of the invention, showing a cross section perpendicular to a medium facing surface.

FIG. 1 is a cross sectional view of a basic structure of a thin film magnetic head 100 of the first embodiment. The thin film magnetic head 100 comprises an integration of a recording head 101 for recording information on a magnetic recording medium such as a hard disk and a reproducing head 102 for reproducing information from the magnetic recording medium. One end surface (the left end surface in FIG. 1) of the thin film magnetic head 100 is a medium facing surface S (or an air bearing surface: ABS) facing the magnetic recording medium and corresponds to a specific example of "a surface facing an external magnetic field" or "a surface facing a recording medium" of the invention. In FIG. 1, the direction of movement of the magnetic recording medium is indicated by arrow Z, and the direction of a track width of the magnetic recording medium (i.e., the direction of a reproducing track width of the thin film magnetic head) is indicated by arrow X. The direction, in which the magnetic recording medium faces the thin film magnetic head 100, is indicated by arrow Y.

The thin film magnetic head 100 has a substrate 1 made of, for example, $Al_2O_3$ and TiC (altic). An insulating layer 2 of 2 $\mu$m to 10 $\mu$m thick made of, for example, $Al_2O_3$ (alumina) and a bottom shield layer 3 of 1 $\mu$m to 3 $\mu$m thick made of a magnetic material such as NiFe (permalloy) are stacked on the base 1. A bottom shield gap layer 4 and a top shield gap layer 6, each of which is made of $Al_2O_3$ or AlN (aluminum nitride) and has a thickness of 10 nm to 100 nm, are formed on the bottom shield layer 3.

An MR element 50 (see FIG. 2) including a stack 5 that is a spin valve film is buried between the bottom shield gap layer 4 and the top shield gap layer 6. A top shield layer-cum-bottom pole 9 (hereinafter referred to as a top shield layer), having a thickness of 1 $\mu$m to 4 $\mu$m, made of a magnetic material such as NiFe, and used in both of the reproducing head 102 and the recording head 101, is formed on the top shield gap layer 6.

A write gap layer 10 of 0.1 $\mu$m to 0.5 $\mu$m thick made of an insulating film such as $Al_2O_3$ is formed on the top shield layer 9. First-layer thin film coils 12 (each having a thickness of 2 $\mu$m to 3 $\mu$m) for the recording head and a photoresist layer 13 for coating the thin film coils 12 are formed on the write gap layer 10 with a photoresist layer 11 of 1.0 $\mu$m to 5.0 $\mu$m thick in between. Second-layer thin film coils 14 (each having a thickness of 2 $\mu$m to 3 $\mu$m) and a photoresist layer 15 for coating the thin film coils 14 are formed on the photoresist layer 13. In the embodiment, the description has been given with regard to an example in which the thin film coils comprise two layers. However, the total number of thin film coils may be one, or three or more.

A top pole 16 of about 3 $\mu$m thick made of a magnetic material for the recording head, e.g., NiFe or FeN that is a material having high saturation magnetic flux density is formed so as to coat the photoresist layers 11, 13 and 15. The top pole 16 is coated with an overcoat layer (an overcoat layer 17 shown in FIG. 9) of 20 $\mu$m to 30 $\mu$m thick made of, for example, $Al_2O_3$, but the overcoat layer is not shown in FIG. 1.

The bottom shield layer 3, the bottom shield gap layer 4, the MR element 50, the top shield gap layer 6 and the top shield layer 9 compose the reproducing head 102 for detecting information from the magnetic recording medium (i.e., a signal magnetic field from the magnetic recording medium). The reproducing head 102 is adapted to detect a change in electrical resistance occurring in the MR element 50 by the signal magnetic field from the magnetic recording medium. The top shield layer 9, the write gap layer 10, the thin film coils 12 and 14 and the top pole 16 compose the recording head 101 for writing information on the magnetic recording medium. The recording head 101 is adapted to generate a magnetic flux in the top and bottom poles 16 and 9 by a current passing through the thin film coils 12 and 14 and thereby magnetize a magnetic layer of the magnetic recording medium by the magnetic flux generated near the write gap layer 10 between the poles 16 and 9.

The bottom shield layer 3 corresponds to a specific example of "a first magnetic shield layer" of the invention. The top shield layer 9 corresponds to a specific example of "a second magnetic shield layer" of the invention. The bottom shield layer 3 and the top shield layer 9 also correspond to a specific example of "two magnetic shield layers" of the invention. The shield gap layers 4 and 8 correspond to a specific example of "a first shield gap layer" and a specific example of "a second shield gap layer" of the invention, respectively. The top shield layer 9 (the bottom pole) and the top pole 16 correspond to a specific example of "two magnetic layers" of the invention. A part including the bottom pole 9, the top pole 16, the thin film coils 12 and 14 and the write gap layer 10 corresponds to a specific example of "an inductive magnetic transducer" of the invention.

Figure 2:
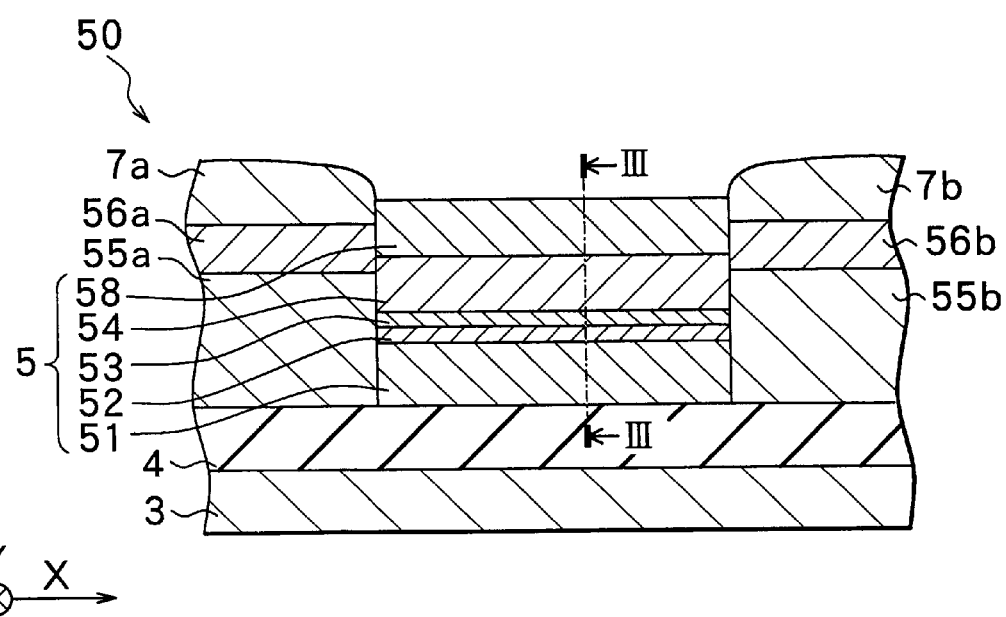
FIG. 2 is a cross sectional view of an MR element of the thin film magnetic head shown in FIG. 1, showing a cross section parallel to the medium facing surface.

FIG. 2 is a cross sectional view of the MR element 50 including the stack 5. FIG. 2 shows a cross section parallel to the medium facing surface S of the thin film magnetic head 100 (a cross section taken along the line II—II of FIG. 1). The stack 5 of the MR element 50 of the embodiment has a stacked structure on the bottom shield gap layer 4: the stacked structure comprising an antiferromagnetic layer 51 made of, for example, PtMn (platinum-manganese); a pinned layer 52 which is a magnetic layer made of, for example, Co (cobalt); a nonmagnetic metal layer 53 made of, for example, Cu (copper); and a free layer 54 made of, for example, NiFe.

When heat treatment takes place at, for example, 250 degrees centigrade in a state in which the pinned layer 52 and the antiferromagnetic layer 51 are stacked, the orientation of magnetization of the pinned layer 52 is fixed by exchange coupling occurring on an interface between the pinned layer 52 and the antiferromagnetic layer 51. In the embodiment, it is assumed that the orientation of magnetization of the pinned layer 52 is fixed in the Y direction in FIG. 2.

Biasing films for preventing a noise (the so-called Barkhausen noise) by matching the orientation of magnetization of the free layer 54 are provided on both sides of the stack 5 along the X direction in FIG. 2. In the embodiment, each biasing film comprises two layers: one biasing film comprises a biasing ferromagnetic layer 55a and a biasing antiferromagnetic layer 56a stacked on the biasing ferromagnetic layer 55a; and the other biasing film comprises a biasing ferromagnetic layer 55b and a biasing antiferromagnetic layer 56b stacked on the biasing ferromagnetic layer 55b. A bias magnetic field to be applied to the free layer 54 is generated by exchange coupling occurring on the interface between the biasing ferromagnetic layer 55a and the biasing antiferromagnetic layer 56a and the interface between the biasing ferromagnetic layer 55b and the biasing antiferromagnetic layer 56b. In the embodiment, it is assumed that the bias magnetic field is applied to the free layer 54 in the X direction in FIG. 2. The antiferromagnetic layer 51 corresponds to a specific example of "an antiferromagnetic layer" of the invention. The pinned layer 52 corresponds to a specific example of "a ferromagnetic layer" of the invention. The nonmagnetic metal layer 53 corresponds to a specific example of "a nonmagnetic layer" of the invention. The free layer 54 corresponds to a specific example of "a soft magnetic layer" of the invention.

Figure 3:
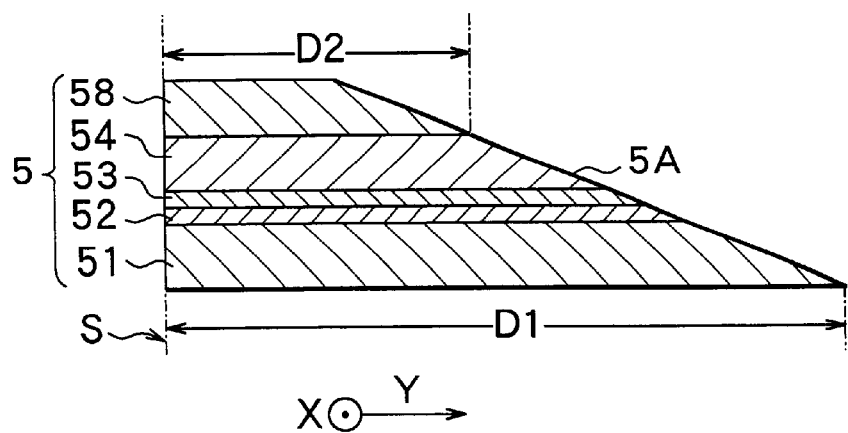
FIG. 3 is a cross sectional view of a stack of the MR element shown in FIG. 2, showing a cross section perpendicular to the medium facing surface.

FIG. 3 is a cross sectional view of the stack 5 taken along the line III—III of FIG. 2. FIG. 3 shows a cross section perpendicular to the medium facing surface S. On the medium facing surface S of the stack 5, one end face (the left end in FIG. 3) of the antiferromagnetic layer 51, the pinned layer 52, the nonmagnetic metal layer 53 and the free layer 54 matches the medium facing surface S. On the other hand, the end face (the right end surface in FIG. 3) opposite to the medium facing surface S of the stack 5 is a tapered surface 5T inclined to the medium facing surface S. The free layer 54, the nonmagnetic metal layer 53, the pinned layer 52 and the antiferromagnetic layer 51 have the distance between the medium facing surface S and the opposite face, which becomes longer in this order. Specifically, a difference (D1–D2) between a distance D1 and a distance D2 is from 0.05 $\mu$m to 1 $\mu$m. The distance D1 refers to the distance between the medium facing surface S of the antiferromagnetic layer 51 and the opposite face, on the side opposite to the free layer 54 (i.e., the bottom surface of the antiferromagnetic layer 51 in FIG. 3). The distance D2 refers to the distance between the medium facing surface S of the free layer 54 and the opposite face, on the side opposite to the antiferromagnetic layer 51 (i.e., the top surface of the free layer 54 in FIG. 3). The distance D2 between the medium facing surface S of the free layer 54 and the opposite face corresponds to an MR height.

<Method of Manufacturing Thin Film Magnetic Head>

Figure 14:
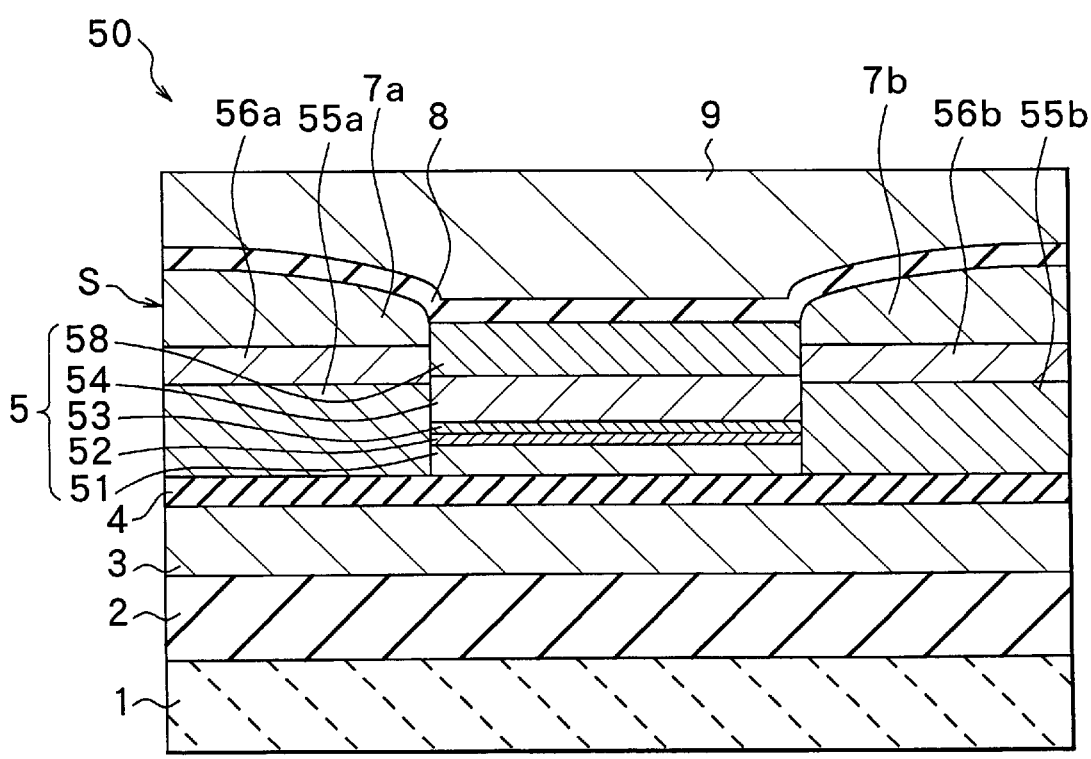
FIG. 14 is an enlarged sectional view for describing a step following the step of FIG. 13.
Figure 15:
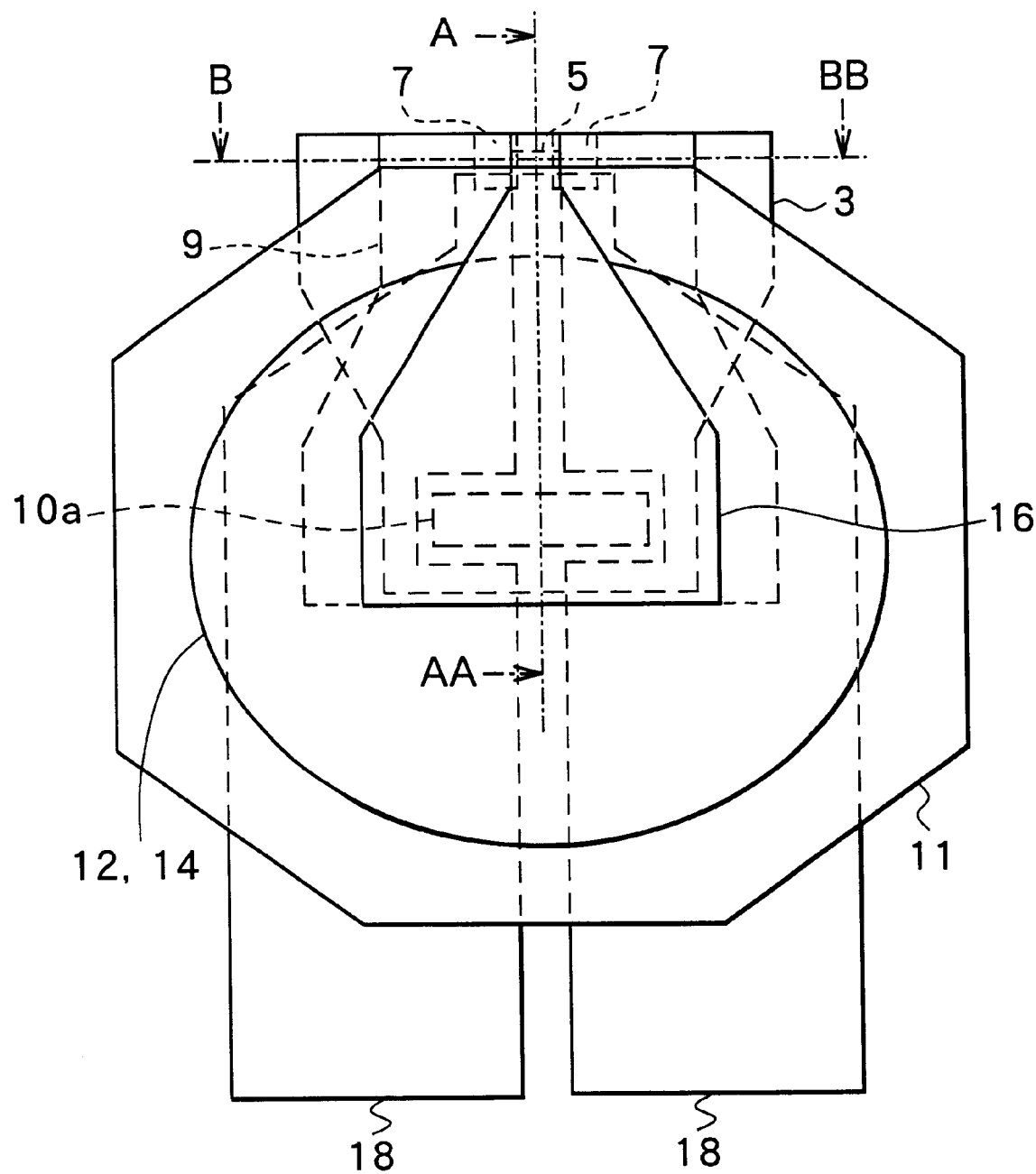
FIG. 15 is a plan view of the thin film magnetic head according to the first embodiment of the invention.

Next, a method of manufacturing the thin film magnetic head 100 will be described with reference to FIGS. 4 to 15. FIGS. 4 to 9 and FIG. 12B show a cross section perpendicular to the medium facing surface S. FIGS. 10, 11, 12A, 13 and 14 show an enlarged cross section of the thin film magnetic head parallel to the medium facing surface. FIG. 15 shows a planar structure of the thin film magnetic head 100.

Figure 4:
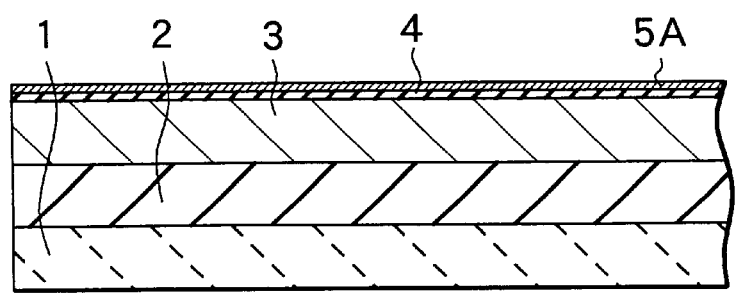
FIG. 4 is a cross sectional view for describing a step of a method of manufacturing the thin film magnetic head according to the first embodiment of the invention.
Figure 10:
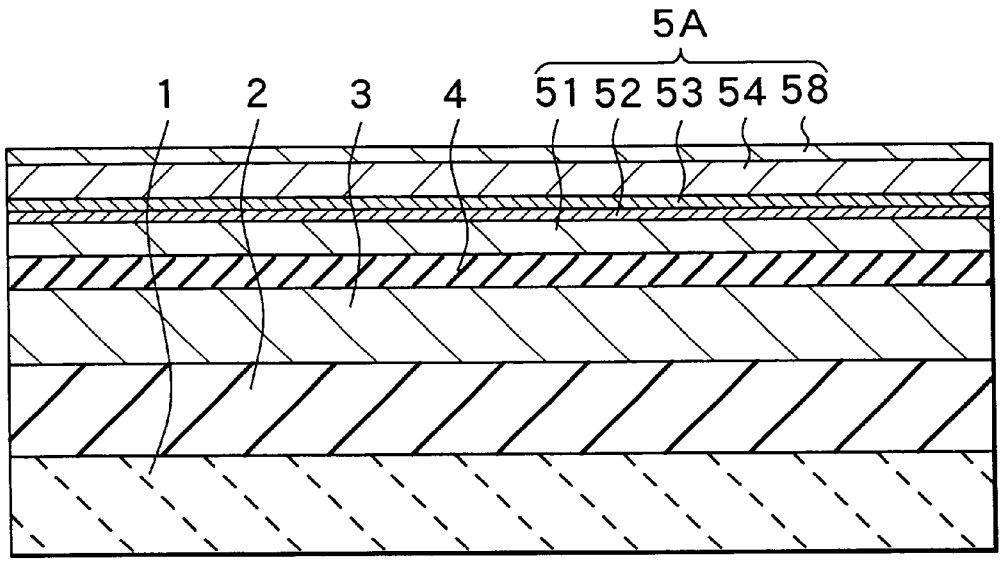
FIG. 10 is an enlarged sectional view for describing a step of the method of manufacturing the thin film magnetic head according to the first embodiment of the invention, showing a cross section parallel to the medium facing surface.

In the manufacturing method according to the embodiment, first, as shown in FIG. 4, the insulating layer 2 made of, for example, $Al_2O_3$ is deposited with a thickness of about 2 $\mu$m to 10 $\mu$m on the base 1 made of, for example, $Al_2O_3$ and TiC. Then, the bottom shield layer 3 made of a magnetic material, for use in the reproducing head is formed with a thickness of 1 $\mu$m to 3 $\mu$m on the insulating layer 2 by plating, for example. Then, for example, $Al_2O_3$ or AlN is deposited with a thickness of 10 nm to 100 nm on the bottom shield layer 3 by sputtering, whereby the bottom shield gap layer 4 is formed as the insulating layer. Then, a stacked film 5A for forming the stack 5 is formed with a thickness of a few tens of nanometers on the bottom shield gap layer 4. Specifically, as shown in FIG. 10 in enlarged view, the antiferromagnetic layer 51, the pinned layer 52, the nonmagnetic metal layer 53, the free layer 54 and a protective layer 58 are stacked in this order on the bottom shield gap layer 4 by sputtering, whereby the stacked film 5A is formed.

The antiferromagnetic layer 51 is formed of a material such as PtMn or NiMn (nickel-manganese) with a thickness of about 20 nm. The pinned layer 52 is formed of a material such as Co with a thickness of about 2 nm. The nonmagnetic metal layer 53 is formed of a material such as Cu with a thickness of 2.5 nm. The free layer 54 is formed of a material such as NiFe with a thickness of 8 nm. In FIG. 10, the respective thicknesses of the antiferromagnetic layer 51, the pinned layer 52, the nonmagnetic metal layer 53, the free layer 54 and the protective layer 58 are exaggerated compared to the thicknesses of the other layers.

The protective layer 58 is made of a single-layer film made of one material selected from among Ta, Nb, Mo, Zr, Hf, Cu, Al, Rh, Ru, Pt, RuRhMn, PtMn, PtMnRh and TiW or one two-layer film selected from among Ta/PtMn, Ta/Cu, Ta/Al, Ta/Ru, TiW/Cu, TiW/Rh and TiW/Ru (incidentally, a mark "/" between elements represents that both the elements are stacked).

Figure 5:
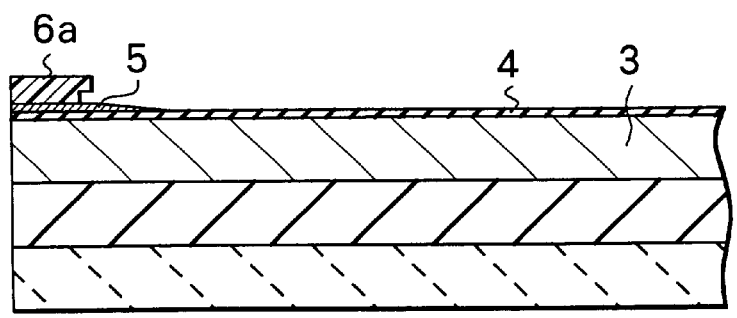
FIG. 5 is a cross sectional view for describing a step following the step of FIG. 4.
Figure 11:
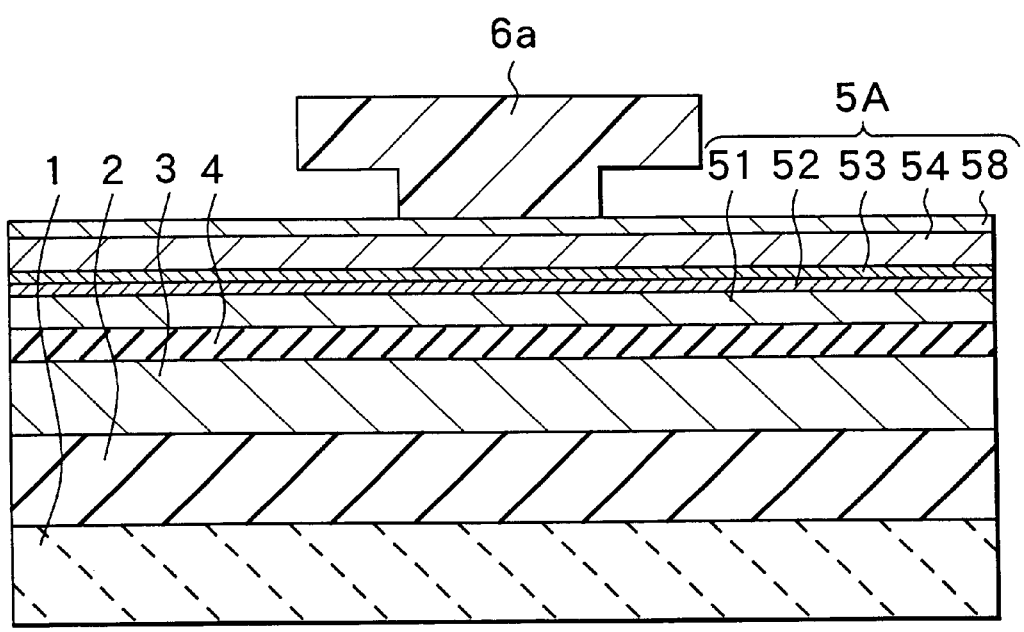
FIG. 11 is an enlarged sectional view for describing a step following the step of FIG. 10.

Then, as shown in FIGS. 5 and 11, a photoresist pattern 6a is selectively formed on the stacked film 5A at a position where the stack 5 is to be formed. The photoresist pattern 6a is, for example, T-shaped in cross section so that lift-off to be described later can be facilitated. Then, the stacked film 5A is etched by using the photoresist pattern 6a as a mask, whereby a pattern of the stack 5 comprising the antiferromagnetic layer 51, the pinned layer 52, the nonmagnetic metal layer 53 and the free layer 54 is formed.

Figure 12A:
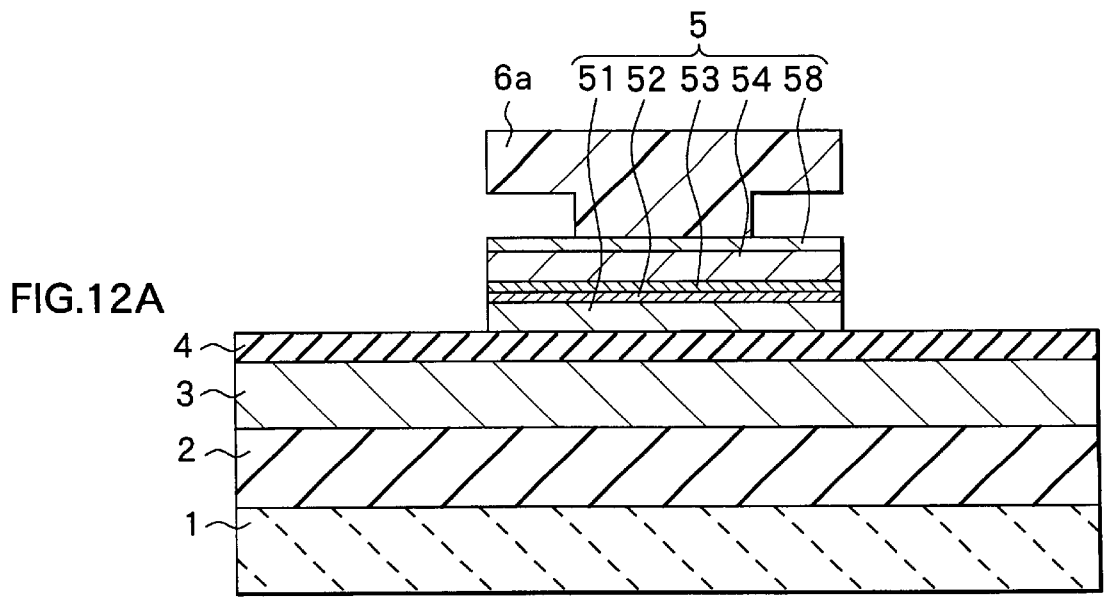
FIGS. 12A and 12B are enlarged sectional views for describing a step following the step of FIG. 11.
Figure 12B:
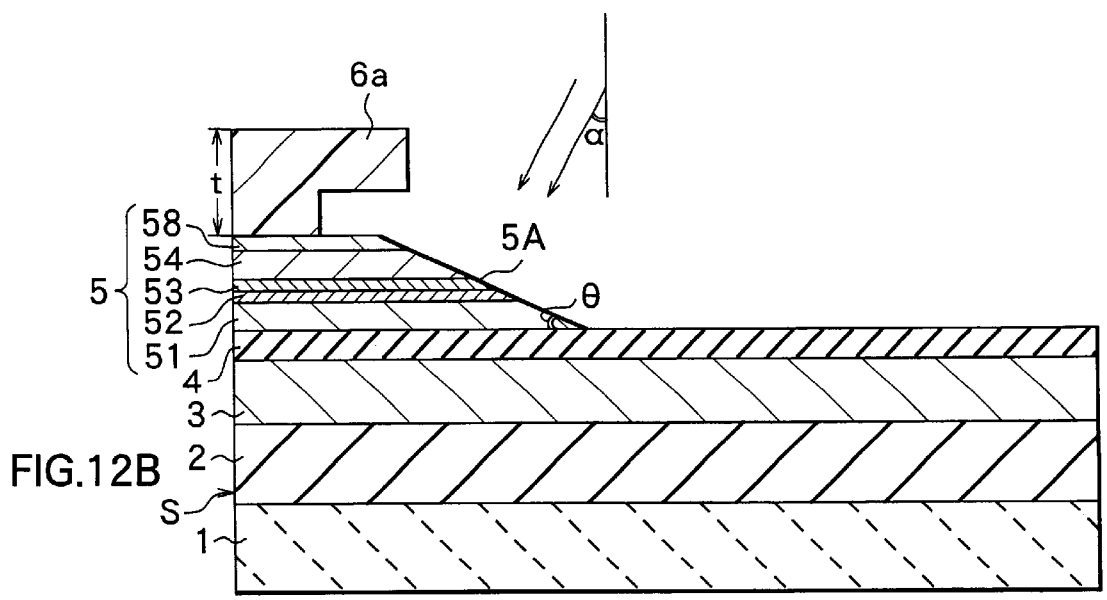

In more detail, as shown in FIGS. 12A and 12B, the stacked film 5A is obliquely etched by means of ion milling using, for example, Ar (argon) or the like by using the photoresist pattern 6a as the mask, whereby the tapered surface 5A is formed on the end face opposite to the medium facing surface S. A taper angle θ is controlled by adjusting at least either an angle a of incidence of ions or a thickness t of the photoresist pattern 6a. Desirably, the angle α of incidence of ions is adjusted within a range of from 10 degrees to 60 degrees, and the thickness t of the photoresist pattern 6a is adjusted within a range of from 0.5 μm to 5.0 μm. For example, when the angle α of incidence of ions is 10 degrees and the thickness t of the photoresist pattern 6a is 3 μm, the taper angle θ of the tapered surface 5A can be 15 degrees. The thicker the thickness t of the photoresist pattern 6a is or the larger the angle α of incidence of ions is, the smaller the taper angle θ is.

Figure 13:
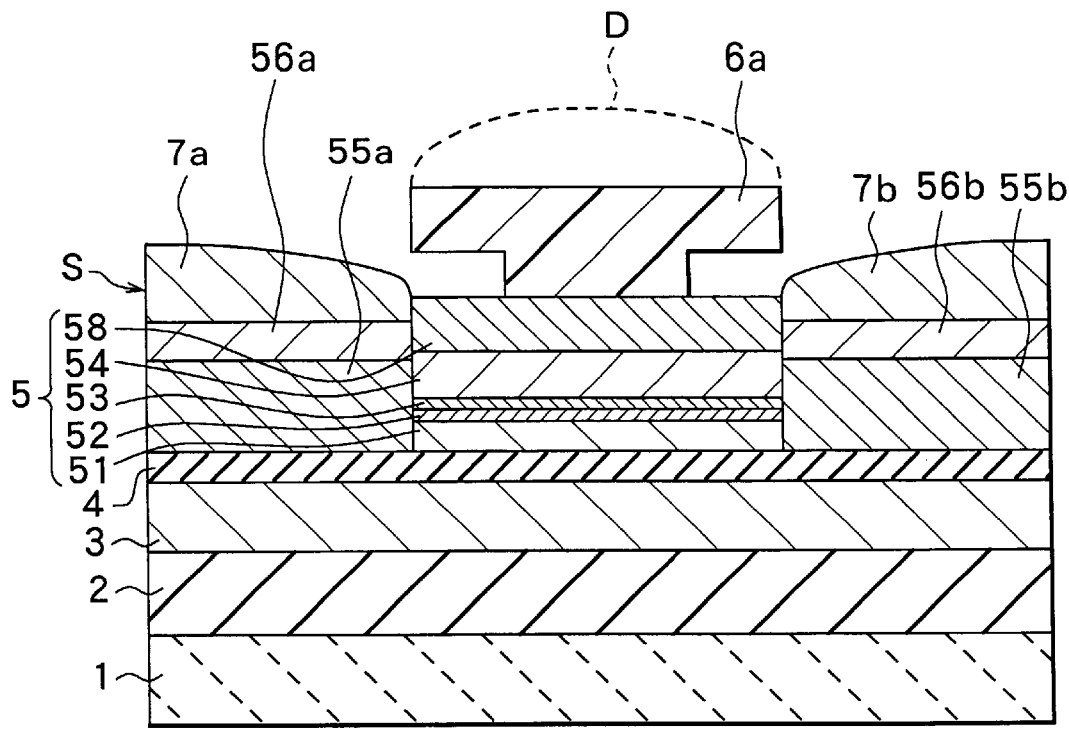
FIG. 13 is an enlarged sectional view for describing a step following the step of FIG. 12.

Then, as shown in FIG. 13, the biasing ferromagnetic layers 55a and 55b and the biasing antiferromagnetic layers 56a and 56b for applying the bias magnetic field to the free layer 54 are stacked on both sides of the stack 5. Furthermore, lead layers 7a and 7b are formed with a thickness of about 100 nm to 200 nm on the biasing antiferromagnetic layers 56a and 56b, respectively. The lead layer 7 is formed as, for example, a stacked film of Ta (tantalum) and Au (gold) or a stacked film of Ti—W (titanium-tungsten alloy) and Ta.

As a material of the biasing antiferromagnetic layer 56a and 56b and the antiferromagnetic layer 51 of the stack 5, any material can be selected from among PtMn whose composition consists of 47 atom % to 52 atom % Pt and 48 atom % to 53 atom % Mn (most preferably, 48 atom % Pt and 52 atom % Mn); PtMnRh whose composition consists of 33 atom % to 52 atom % Pt, 45 atom % to 57 atom % Mn and 0 atom % to 17 atom % Rh (most preferably, 40 atom % Pt, 51 atom % Mn and 9 atom % Rh); and RuRhMn whose composition consists of 0 atom % to 20 atom % Ru, 0 atom % to 20 atom % Rh and 75 atom % to 85 atom % Mn (most preferably, 3 atom % Ru, 15 atom % Rh and 82 atom % Mn).

Figure 6:
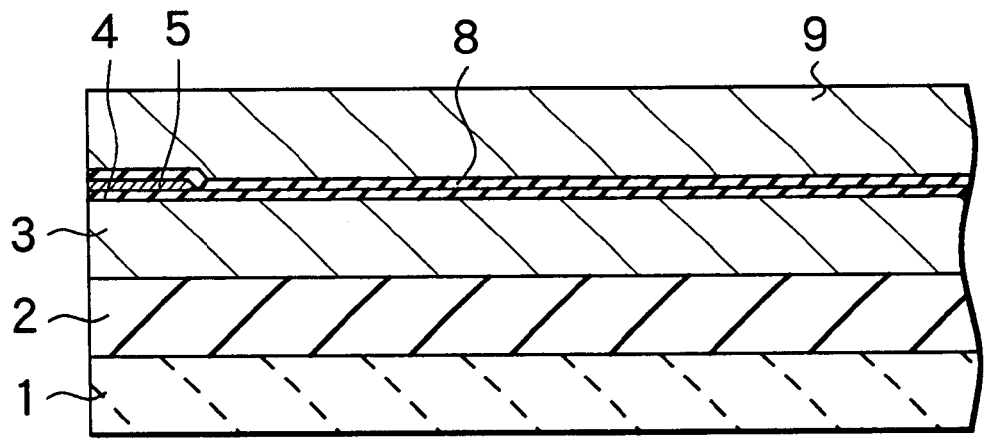
FIG. 6 is a cross sectional view for describing a step following the step of FIG. 5.

Then, the photoresist pattern 6a and a deposit D (the respective materials of the biasing ferromagnetic layer, the biasing antiferromagnetic layer and the lead layer) stacked on the photoresist pattern 6a are removed by lift-off. Then, as shown in FIGS. 6 and 14, a top shield gap layer 8 made of an insulating film such as AlN is formed with a thickness of about 10 nm to 100 nm so as to coat the bottom shield gap layer 4 and the stack 5, whereby the stack 5 is buried in the shield gap layers 4 and 8. Then, the top shield layer-cum-bottom pole 9 (hereinafter referred to as the top shield layer) made of a magnetic material, for use in both of the reproducing head and the recording head is formed with a thickness of about 1 μm to 4 μm on the top shield gap layer 8.

Figure 7:
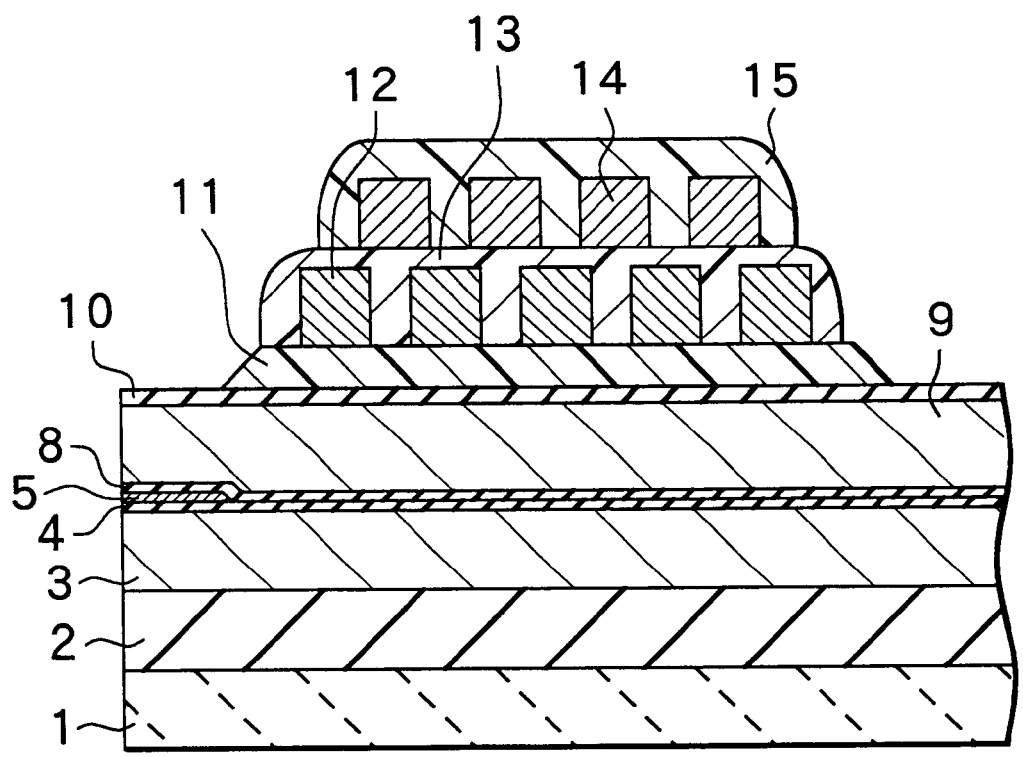
FIG. 7 is a cross sectional view for describing a step following the step of FIG. 6.

Then, as shown in FIG. 7, the write gap layer 10 made of an insulating film, e.g., an Al$_2$O$_3$ film is formed with a thickness of 0.1 μm to 0.5 μm on the top shield layer 9. The photoresist layer 11 for determining a throat height is formed into a predetermined pattern with a thickness of about 1.0 μm to 2.0 μm on the write gap layer 10. Then, the first-layer thin film coils 12 for an inductive recording head are formed with a thickness of 2 μm to 3 μm on the photoresist layer 11. Then, the photoresist layer 13 is formed into a predetermined pattern so as to coat the photoresist layer 11 and the thin film coils 12. Then, the second-layer thin film coils 14 are formed with a thickness of 2 μm to 3 μm on the photoresist layer 13. Then, the photoresist layer 15 is formed into a predetermined pattern so as to coat the photoresist layer 13 and the thin film coils 14. The thin film coils 12 and 14 correspond to "thin film coils" of the invention.

Figure 8:
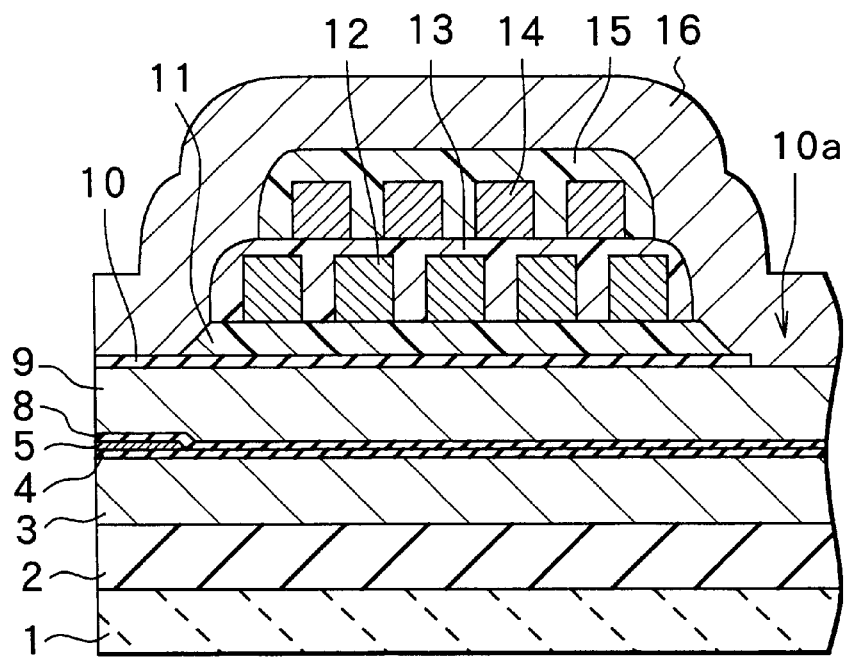
FIG. 8 is a cross sectional view for describing a step following the step of FIG. 7.

Then, as shown in FIG. 8, the write gap layer 10 is partially etched at the rear of the thin film coils 12 and 14 (on the right side in FIG. 8) in order to form a magnetic path, whereby an opening 10a is formed. Then, the top pole 16 made of a magnetic material for the recording head, e.g., NiFe or FeN that is a material having high saturation magnetic flux density is formed into a pattern with a thickness of about 3 μm so as to coat the write gap layer 10, the opening 10a and the photoresist layers 11, 13 and 15. The top pole 16 is in contact with and magnetically coupled to the top shield layer 9 (the bottom pole) in the opening 10a at the rear of the thin film coils 12 and 14.

Figure 9:
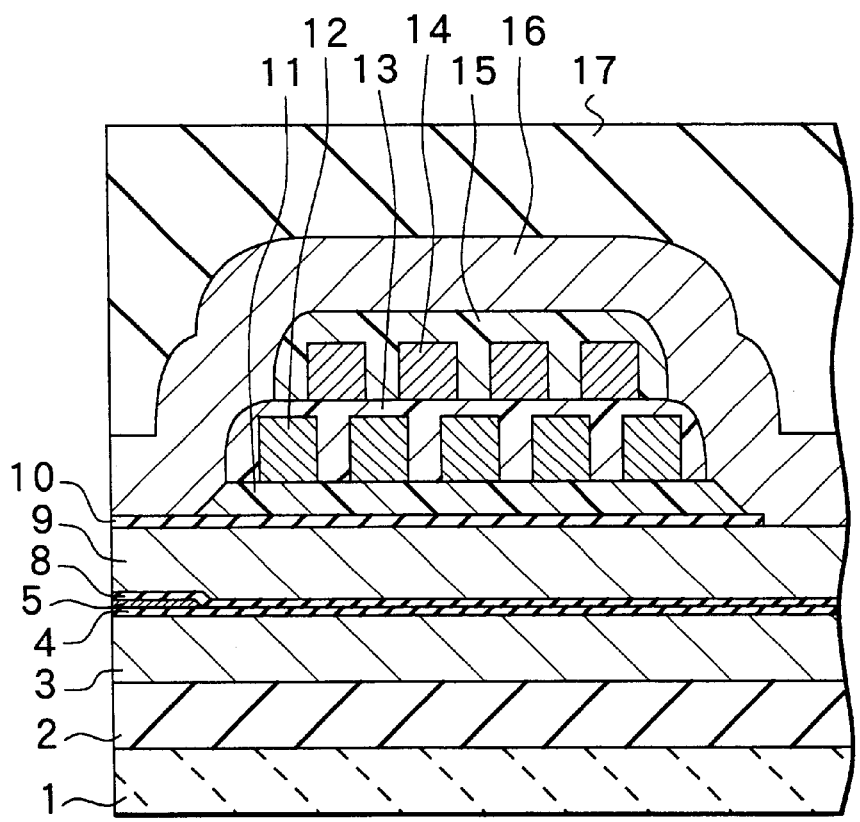
FIG. 9 is a cross sectional view for describing a step following the step of FIG. 8.

Then, as shown in FIG. 9, the write gap layer 10 and the top shield layer 9 (the bottom pole) are etched by ion milling using the top pole 16 as a mask. Then, the overcoat layer 17 made of, for example, Al$_2$O$_3$ is formed with a thickness of 20 μm to 30 μm on the top pole 16. Then, performed are the processing for causing exchange coupling on the interface between the antiferromagnetic layer 51 and the pinned layer 52 in order to fix (pin) the orientation of magnetic field of the pinned layer 52 and the processing for causing exchange coupling on the interface between the biasing antiferromagnetic layer 56a and the biasing ferromagnetic layer 55a and the interface between the biasing antiferromagnetic layer 56b and the biasing ferromagnetic layer 55b in order to generate the bias magnetic field.

Desirably, a temperature (a blocking temperature) at which exchange coupling can occur on the interface between the antiferromagnetic layer 51 and the pinned layer 52 differs from a temperature at which exchange coupling can occur on the interface between the biasing antiferromagnetic layer 56a and the biasing ferromagnetic layer 55a and the interface between the biasing antiferromagnetic layer 56b and the biasing ferromagnetic layer 55b. When the former is higher than the latter, the thin film magnetic head 100 is heated at a higher temperature than the former (the blocking temperature of the antiferromagnetic layer 51 and the pinned layer 52) by using a chamber with a magnetic field generating apparatus, or the like. Then, the thin film magnetic head 100 is gradually cooled. When the temperature of the thin film magnetic head 100 reaches the blocking temperature of the antiferromagnetic layer 51 and the pinned layer 52, the magnetic field is applied to the pinned layer 52 along a predetermined orientation of magnetization (in the Y direction in FIG. 2 or 3). Thus, the orientation of magnetization of the pinned layer 52 is fixed. When the temperature of the thin film magnetic head 100 drops to the blocking temperature of the biasing antiferromagnetic layers 56a and 56b and the biasing ferromagnetic layers 55a and 55b, the magnetic field is applied to the biasing ferromagnetic layers 55a and 55b along a predetermined orientation of magnetization (in the X direction in FIG. 2 or 3). Thus, the orientation of magnetization of the biasing ferromagnetic layers 55a and 55b is fixed. The bias magnetic field is applied to the stack 5 sandwiched between both the biasing ferromagnetic layers 55a and 55b by the biasing ferromagnetic layers 55a and 55b having the fixed orientation of magnetization. When the blocking temperature of the antiferromagnetic layer 51 and the pinned layer 52 is lower than the blocking temperature of the biasing antiferromagnetic layers 56a and 56b and the biasing ferromagnetic layers 55a and 55b, a procedure of the processing is the reverse of the above-mentioned procedure.

Finally, the medium facing surface S of the recording head and the reproducing head is formed by machining a slider, whereby the thin film magnetic head 100 is completed. Although not shown in the drawings, the thin film magnetic head 100 has a so-called trim structure in which the respective side walls of parts of the top pole 16, the write gap layer 10 and the top shield layer 9 (the bottom pole) are vertically formed in self-alignment. The trim structure can prevent an increase in an effective track width resulting from a spread of the magnetic flux generated during writing data on a narrow track.

FIG. 15 is a plan view of the thin film magnetic head 100 manufactured as described above. In FIG. 15, the overcoat layer 17 is not shown. FIGS. 4 to 9 and FIG. 12B correspond to a cross section taken along the line A–AA of FIG. 15. FIGS. 10, 11, 12A, 13 and 14 correspond to a cross section taken along the line B–BB of FIG. 15.

PtMn or NiMn used as the material of the antiferromagnetic layer 51 in the embodiment has a CuAu—I type regular crystal structure and requires heating in order to cause exchange coupling. When a compound having an irregular crystal structure, such as FeMn (iron-manganese) is used as the antiferromagnetic layer 51, the orientation of magnetization of the pinned layer 52 is fixed only by bringing the pinned layer 52 into contact with the antiferromagnetic layer 51. Therefore, the compound does not require heating. Similarly, the compound having the irregular crystal structure, such as FeMn can be used as the biasing antiferromagnetic layers 56a and 56b.

<Operation of Thin Film Magnetic Head>

Next, an operation (a reproducing operation) of the thin film magnetic head 100 configured as described above will be described.

In FIGS. 2 and 3, the orientation of magnetization of the pinned layer 52 is fixed in the Y direction in FIG. 3 by an exchange anisotropic magnetic field generated by exchange coupling occurring on the interface between the pinned layer 52 and the antiferromagnetic layer 51 of the stack 5. The orientation of magnetization of the free layer 54 is matched to the direction of the track width (the X direction in FIG. 2) by the bias magnetic field generated by the biasing ferromagnetic layers 55a and 55b located on both sides of the stack 5.

A sense current, which is a direct-current constant current, is passed through the pinned layer 52, the nonmagnetic metal layer 53 and the free layer 54 through the lead layers 7a and 7b in the X direction in FIG. 2. On receiving the signal magnetic field from the magnetic recording medium, the orientation of magnetization of the free layer 54 changes. Electrical resistance changes in accordance with a relative angle between the orientation of magnetization of the free layer 54 and the (fixed) orientation of magnetization of the pinned layer 52, and thus a change in electrical resistance is detected as a voltage change.

At this time, the sense current passes through the stack 5, whereby Joule's heat is generated. Joule's heat is mainly generated by the current passing through the pinned layer 52, the nonmagnetic metal layer 53 and the free layer 54. Joule's heat is dissipated from the antiferromagnetic layer 51 through the bottom shield gap layer 4 and the bottom shield layer 3.

In the embodiment, as described above, the free layer 54, the nonmagnetic metal layer 53, the pinned layer 52 and the antiferromagnetic layer 51 have the distance between the medium facing surface S and the opposite face, which becomes longer in this order. In other words, an area of the antiferromagnetic layer 51 is larger than that of the free layer 54, and therefore efficiency of heat dissipation improves compared to the case where the area of the antiferromagnetic layer 51 is the same as that of the free layer 54.

Detection of the signal magnetic field is performed in accordance with a variation in the orientation of magnetization of the free layer 54. Therefore, the reproducing track width and the MR height of the MR element 50 can be reduced in accordance with the track width of the magnetic recording medium in order to adapt to the increase in a density of the magnetic recording medium. In the embodiment, the area of the antiferromagnetic layer 51 is larger than that of the free layer 54, and therefore a heat dissipation area can be ensured by the antiferromagnetic layer 51 even if the free layer 54 is reduced in size. In other words, the efficiency of heat dissipation of the MR element can be improved while adapting to high-density recording.

Figure 16:
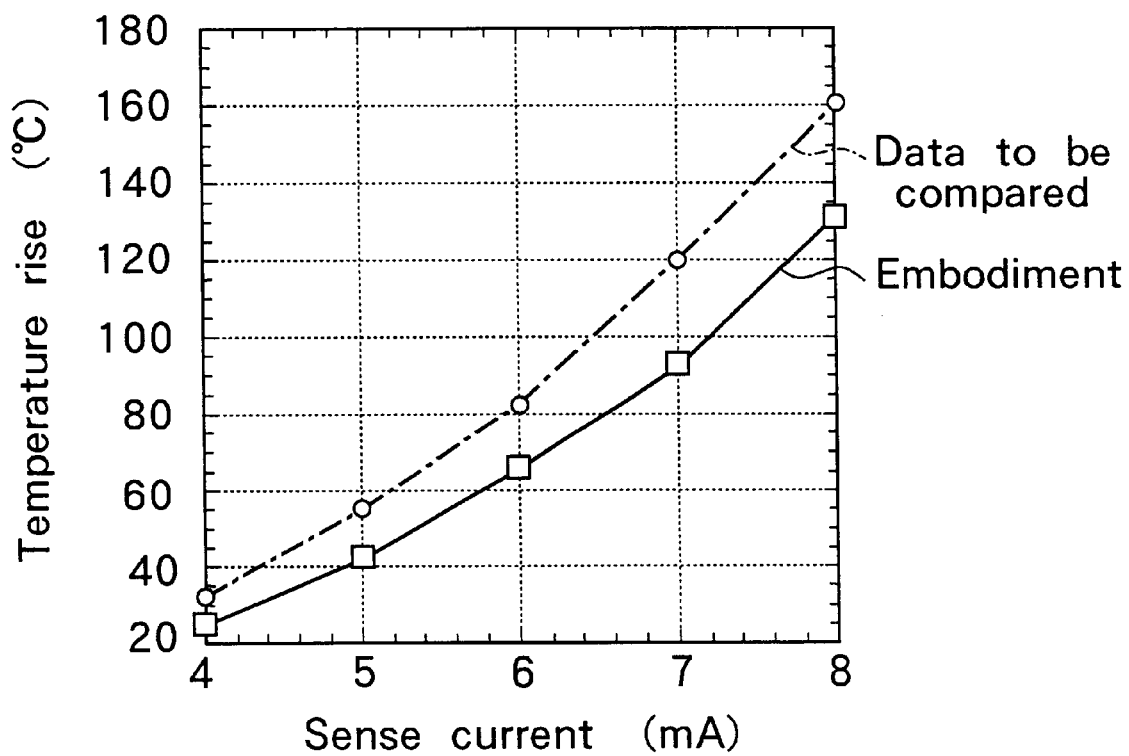
FIG. 16 is a plot of experimental results of a heat dissipation effect of the first embodiment of the invention.

FIG. 16 shows the result of measurement of a rise in the temperature of the MR element 50 of the embodiment through which a current of 4 mA to 8 mA is passed. The distance D1 between the medium facing surface S of the antiferromagnetic layer 51 shown in FIG. 3 and the opposite face on the edge opposite to the free layer 54 (i.e., the bottom surface of the antiferromagnetic layer 51 in FIG. 3) is set to 1 $\mu$m. The distance D2 between the medium facing surface S of the free layer 54 and the opposite face on the edge opposite to the antiferromagnetic layer 51 (i.e., the top surface of the free layer 54 in FIG. 3) is set to 0.5 $\mu$m. That is, the difference (D1–D2) between the distance D1 between the medium facing surface S of the antiferromagnetic layer 51 and the opposite face on the edge opposite to the free layer 54 and the distance D2 between the medium facing surface S of the free layer 54 and the opposite face on the edge opposite to the antiferromagnetic layer 51 is equal to 0.5 $\mu$m. For comparison, FIG. 16 also shows experimental data on the MR element in which the distance between the medium facing surface S of the antiferromagnetic layer and the opposite face is the same as the distance between the medium facing surface S of the free layer and the opposite face (both of the distances are equal to 0.5 $\mu$m).

The tapered surface 5A is provided on the end face of the stack 5 and the distance between the medium facing surface S of the antiferromagnetic layer 51 and the opposite face is longer than the distance between the medium facing surface S of the free layer 54 and the opposite face, whereby the temperature rise can be reduced by 25% to 30% as shown in FIG. 16.

Figure 17:
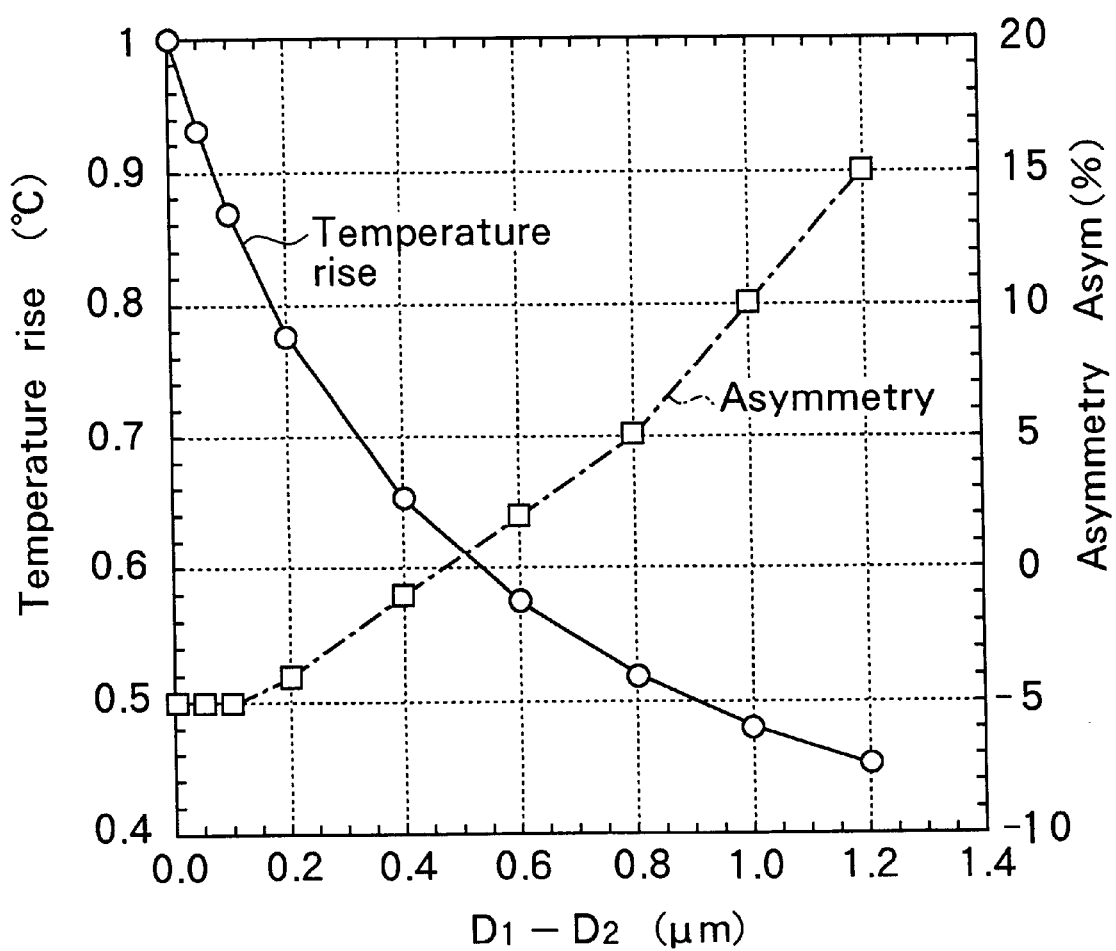
FIG. 17 is a plot of experimental results of the heat dissipation effect and asymmetry of the first embodiment of the invention.

FIG. 17 is a plot of a correlation between the difference (D1–D2) and the rise in the temperature of the MR element, where the difference (D1–D2) refers to the difference between the distance D1 between the medium facing surface S of the antiferromagnetic layer 51 and the opposite face on the edge opposite to the free layer 54 and the distance D2 between the medium facing surface S of the free layer 54 and the opposite face on the edge opposite to the antiferromagnetic layer 51. In FIG. 17, the temperature rise is expressed as a relative value to the temperature rise (° C.) which occurs when the stack 5 is not tapered, i.e., when (D1–D2) is equal to 0. In FIG. 17, a direct-current constant current of 6 mA is passed through the stack 5.

Figure 18:
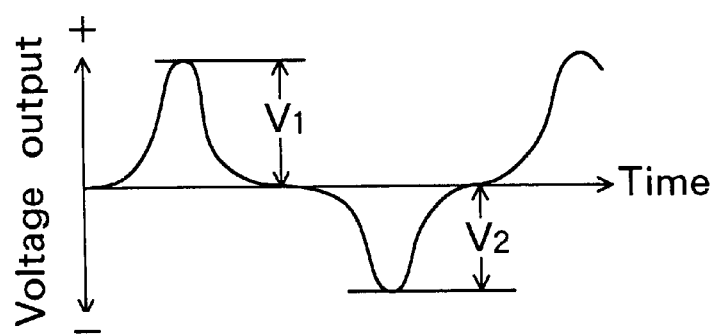
FIG. 18 is a conceptual illustration of the asymmetry.

FIG. 17 also shows asymmetry of a plus output and a minus output of a read output (a voltage output) of the MR element 50 when the magnetic fields (S and N) of the magnetic recording medium are switched in a state in which the thin film magnetic head 100 is caused to face the magnetic recording medium. As shown in FIG. 18, asymmetry Asym is defined as expressed by the following equation (1) in accordance with a plus peak value V1 and a minus peak value V2 (both of V1 and V2 are absolute values) of an output waveform of the MR element 50.

$$\text{Asym}=(V1-V2)/V1\times 100 \quad (1)$$

In general, the MR element requires the asymmetry which is limited so as to fall within a range of ±10%.

As shown in FIG. 17, when the above-mentioned difference (D1–D2) between the distances is less than 0.05 $\mu$m, little heat dissipation effect of the MR element 50 is achieved. On the other hand, when the above-mentioned difference (D1–D2) between the distances is more than 1.0 $\mu$m, the asymmetry exceeds 10% (because of an influence of the magnetic field generated by the sense current diverted to a tapered portion of the antiferromagnetic layer 51). It is therefore desirable that the difference (D1–D2) between the distance D1 between the medium facing surface S of the antiferromagnetic layer 51 and the opposite face on the edge opposite to the free layer 54 and the distance D2 between the medium facing surface S of the free layer 54 and the opposite face on the edge opposite to the antiferromagnetic layer 51 is from 0.05 $\mu$m to 1.0 $\mu$m.

<Effect of First Embodiment>

As described above, according to the embodiment, in the stack 5 of the MR element 50, the distance between the medium facing surface S of the antiferromagnetic layer 51 and the opposite face is longer than the distance between the medium facing surface S of the free layer 54 and the opposite face. Therefore, the area of the antiferromagnetic layer 51 required for heat dissipation can be ensured while reducing the MR height and the like of the MR element 50 in accordance with the track width of the magnetic recording medium. In other words, the efficiency of heat dissipation can be improved while adapting to the increase in the density of the magnetic recording medium.

Joule's heat of the MR element 50 is generated, particularly, at the center of the stack 5 in the direction of the reproducing track width. In the embodiment, the distance between the medium facing surface S of the antiferromagnetic layer 51 and the opposite face is longer. Therefore, heat generated at the center of the stack 5 can be efficiently dissipated, compared to the case where a length of the antiferromagnetic layer 51 is longer in the direction of the reproducing track width.

Moreover, in the embodiment, the tapered surface 5A is formed on the end face opposite to the medium facing surface S of the stack comprising the free layer 54, the nonmagnetic metal layer 53, the pinned layer 52 and the antiferromagnetic layer 51. Therefore, the distance between the medium facing surface S of the antiferromagnetic layer 51 and the opposite face can be longer than the distance between the medium facing surface S of the free layer 54 and the opposite face by a relatively simple method (a method in which the angle of incidence of ions for ion milling is inclined, or the like).

Second Embodiment

Next, a second embodiment of the invention will be described.

Figure 19:
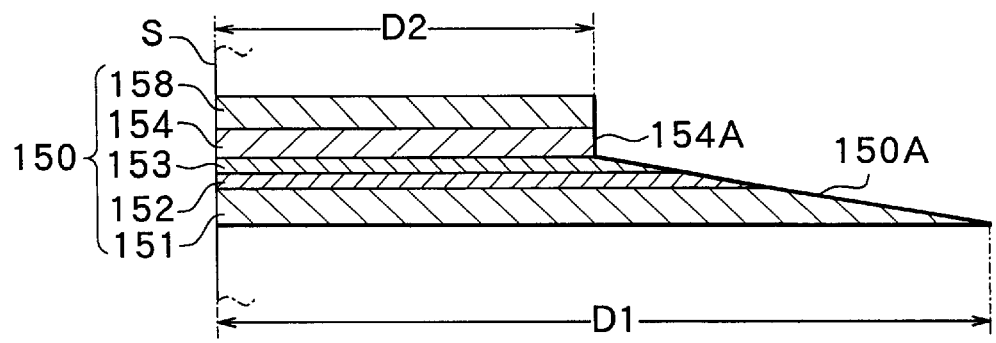
FIG. 19 is a cross sectional view of a stack of a thin film magnetic head according to a second embodiment of the invention, showing a cross section perpendicular to the medium facing surface.

FIG. 19 is a cross sectional view of a structure of a stack of an MR element of the second embodiment. Similarly to the first embodiment, a stack 150 of the MR element of the second embodiment has a stacked structure comprising an antiferromagnetic layer 151 of 20 nm thick made of, for example, PtMn; a pinned layer 152 of 2 nm thick made of, for example, Co; a nonmagnetic metal layer 153 of 2.5 nm thick made of, for example, Cu; a free layer 154 of 8 nm thick made of, for example, NiFe; and a protective layer 158 made of, for example, Cu.

In the embodiment, an end face 154A of the free layer 154 opposite to the medium facing surface S is substantially parallel to the medium facing surface S. The respective end faces of three layers: the antiferromagnetic layer 151, the pinned layer 152 and the nonmagnetic metal layer 153, opposite to the medium facing surface S are formed as a tapered surface 150A inclined to the medium facing surface S. The difference (D1–D2) between the distance D1 between the medium facing surface S of the antiferromagnetic layer 151 and the opposite face on the edge opposite to the free layer 154 and the distance D2 between the medium facing surface S of the free layer 154 and the opposite face is, for example, from 0.05 $\mu$m to 1 $\mu$m. Except the stack 150, the structure of the MR element of the second embodiment is the same as the structure (see FIG. 2) of the MR element 50 of the first embodiment.

Next, a method of manufacturing the MR element according to the second embodiment will be described. Similarly to the first embodiment, the insulating layer 2 made of, for example, Al$_2$O$_3$, the bottom shield layer 3 made of NiFe and the bottom shield gap layer 4 made of, for example, Al$_2$O$_3$ or AlN are stacked in sequence on the substrate 1 made of, for example, Al$_2$O$_3$ and TiC. Then, a stacked film 105 for forming the stack 150 is formed with a thickness of a few tens of nanometers on the bottom shield gap layer 4. Specifically, the antiferromagnetic layer 151, the pinned layer 152, the nonmagnetic metal layer 153, the free layer 154 and the protective layer 158 are stacked in this order on the bottom shield gap layer 4 by sputtering, whereby the stacked film 105 is formed.

Figure 20:
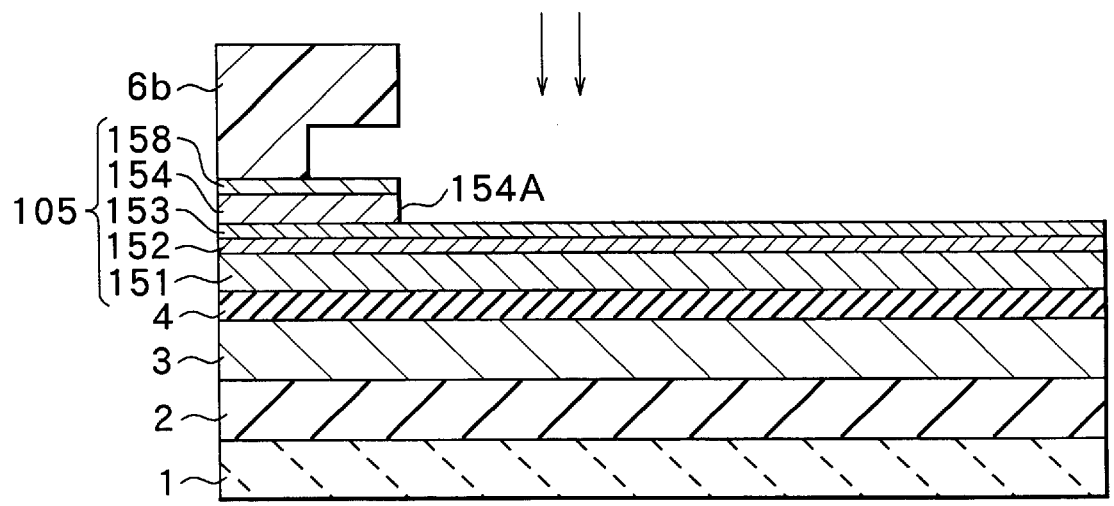
FIG. 20 is an enlarged sectional view for describing a step of a method of manufacturing the stack shown in FIG. 19.

Then, as shown in FIG. 20, a photoresist pattern 6b is selectively formed on the stacked film 105 at a position where the stack 150 is to be formed. Specifically, the stacked film 105 is etched by means of ion milling using, for example, Ar (argon) or the like by using the photoresist pattern 6b as a mask.

Figure 21:
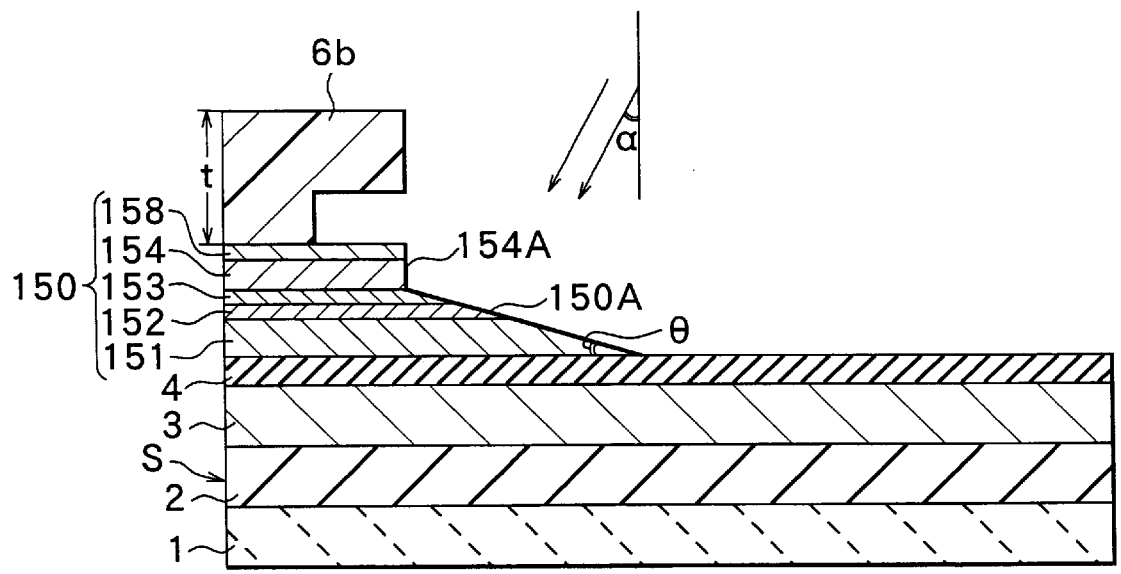
FIG. 21 is an enlarged sectional view for describing a step following the step of FIG. 20.

An etching process of the stacked film 105 includes the following two steps. In etching the free layer 154 and the protective layer 158, the direction of incidence of ions for ion milling is perpendicular to a film surface (i.e., parallel to the medium facing surface S) as shown in FIG. 20. Thus, the end face 154A of the free layer 154 opposite to the medium facing surface S is formed into a vertical surface. After the end of etching of the free layer 154 and the protective layer 158, the direction of incidence of ions is inclined as shown in FIG. 21 so that the tapered surface 150A is formed on the remaining three layers (the nonmagnetic metal layer 153, the pinned layer 152 and the antiferromagnetic layer 151). Similarly to the first embodiment, it is desirable that the angle α of incidence of ions is adjusted within a range of from 10 degrees to 60 degrees and the thickness t of the photoresist pattern 6b is adjusted within a range of from 0.5 μm to 5.0 μm. For example, when the angle α of incidence of ions is 10 degrees and the thickness t of the photoresist pattern 6b is 3 μm, the taper angle θ of the tapered surface 150A can be 15 degrees.

Thus, as shown in FIG. 21, the tapered surface 150A can be formed on the remaining three layers (the nonmagnetic metal layer 153, the pinned layer 152 and the antiferromagnetic layer 151) without tapering the end faces of the free layer 154 and the protective layer 158. The subsequent steps are the same as the steps of the above-mentioned first embodiment. That is, the thin film magnetic head is completed through the same steps as the steps of the above-mentioned first embodiment shown in FIGS. 4 to 9.

In the thin film magnetic head of the embodiment, the area (the heat dissipation area) of the antiferromagnetic layer 151 is larger than the area of the free layer 154. Therefore, the same effect as the effect of the first embodiment is obtained: the effect of being able to improve the efficiency of heat dissipation while adapting to the increase in the density of the magnetic recording medium is obtained. Furthermore, in the embodiment, one end face of the free layer 154 is parallel to the opposite face, and therefore the MR height can be more precisely determined.

Moreover, in the step of etching the stack by ion milling, the direction of incidence of ions in etching the free layer 154 differs from the direction of incidence of ions in etching the remaining three layers. Therefore, only the end face of the free layer 154 can be formed into the vertical surface, and the tapered surface 150A can be formed on the end faces of the remaining three layers.

Figure 22:
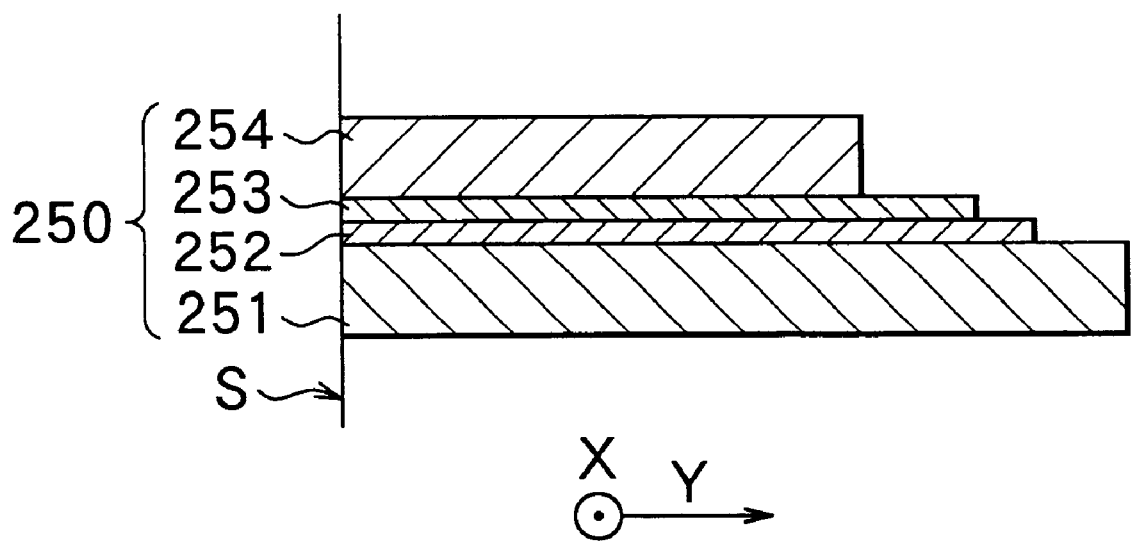
FIG. 22 shows an example of another method of stacking layers of a stack.

In the first and second embodiments, the surface of the stack of MR element opposite to the medium facing surface is formed as the tapered surface. However, as shown in FIG. 22, a stepped surface may be formed by changing the distance between the medium facing surface S of each of an antiferromagnetic layer 251, a pinned layer 252, a nonmagnetic metal layer 253 and a free layer 254 of a stack 250 and the opposite surface. For example, each layer is etched so that the end face thereof may be perpendicular to the substrate, whereby the stack having the stepped surface can be formed.

Third Embodiment

An MR element functioning as a magnetic transducer according to a third embodiment of the invention and a thin film magnetic head functioning as the thin film magnetic head using the MR element will be described with reference to FIGS. 23 to 40.

<Structures of MR Element and Thin Film Magnetic Head>

Figure 23:
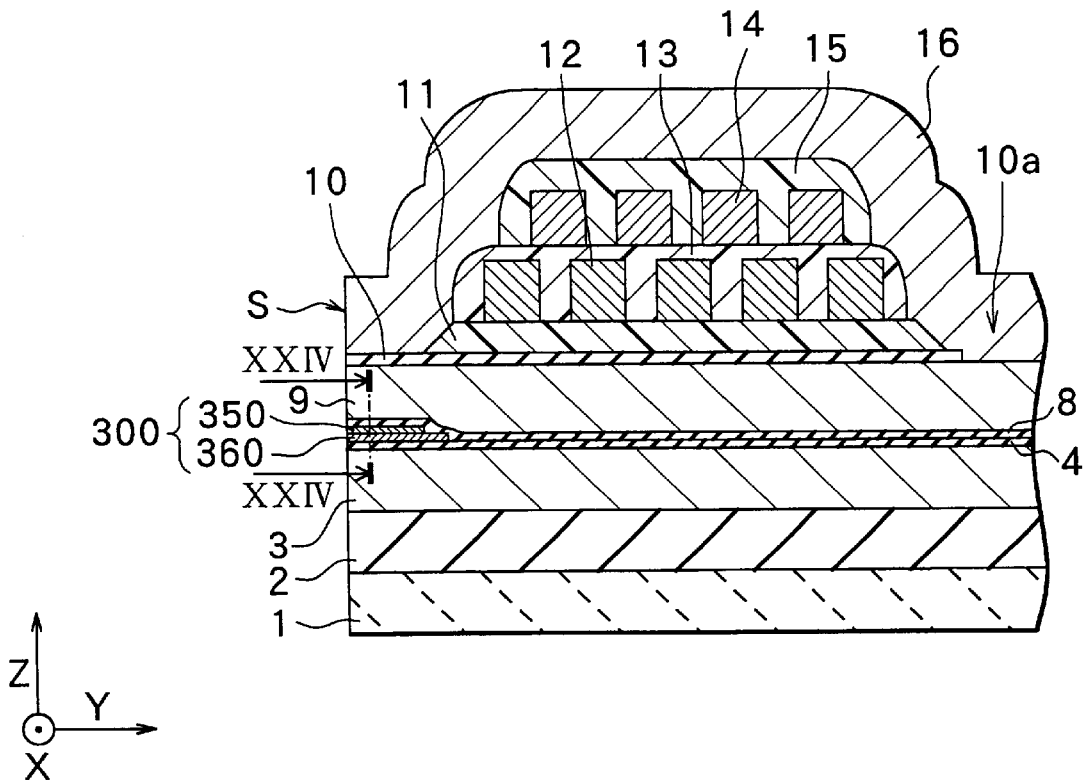
FIG. 23 is a cross sectional view of a thin film magnetic head according to a third embodiment of the invention, showing a cross section perpendicular to the medium facing surface.

FIG. 23 is a cross sectional view of a basic structure of a thin film magnetic head of the third embodiment. The third embodiment is the same as the first embodiment, except the structure of a stack 350 of an MR element 300. Accordingly, structural components in common with the first embodiment are indicated by the same reference numerals and symbols, and the description thereof is omitted.

The thin film magnetic head comprises the substrate 1, the insulating layer 2, the bottom shield layer 3, the bottom shield gap layer 4, the top shield gap layer 8, the top shield layer 9, the write gap layer 10, the photoresist layer 11, the thin film coils 12 and 14, the photoresist layers 13 and 15, the top pole 16 and the overcoat layer 17 (see FIGS. 34A and 34B), which are configured in the same manner as the first embodiment. The MR element 300 is buried between the bottom shield gap layer 4 and the top shield gap layer 8.

Figure 24:
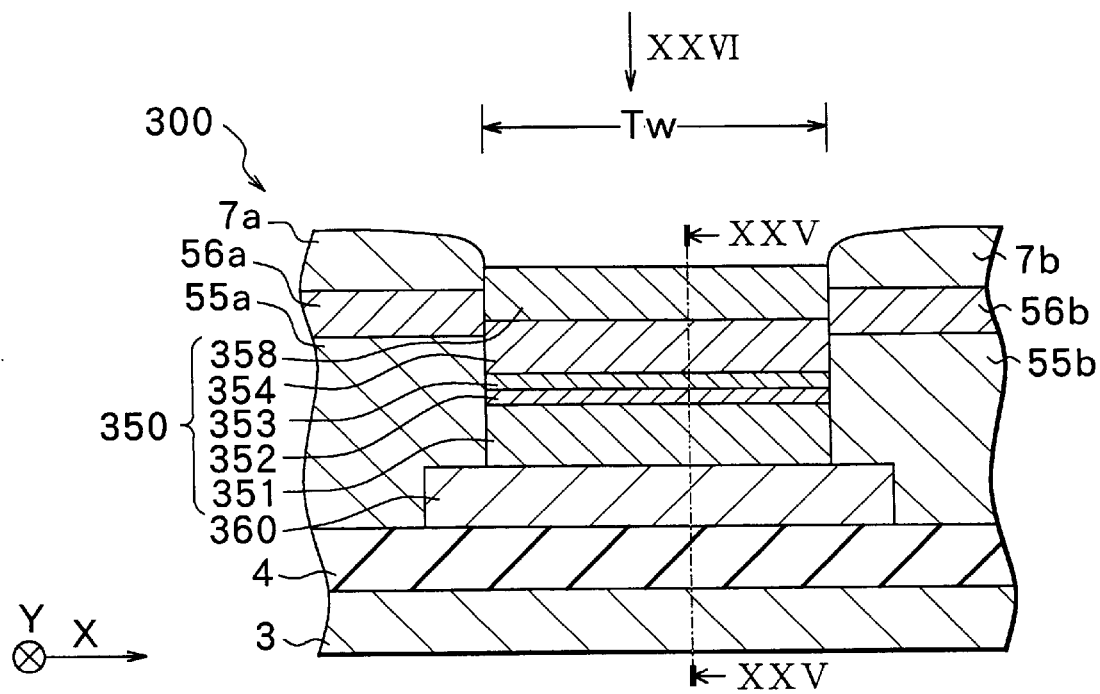
FIG. 24 is a cross sectional view of an MR element of the thin film magnetic head shown in FIG. 23, showing a cross section parallel to the medium facing surface.

FIG. 24 is a cross sectional view of the MR element 300. FIG. 24 shows a cross section parallel to the medium facing surface S of the thin film magnetic head (a cross section taken along the line XXIV—XXIV of FIG. 23). The MR element 300 of the embodiment includes a heat dissipation layer 360 made of nonmagnetic metal of high resistance (Zn, Bi, Ta, Pt, Pd or the like) formed on the bottom shield gap layer 4, and the stack 350 formed on the heat dissipation layer 360. The stack 350 has a stacked structure on the heat dissipation layer 360: the stacked structure comprising an antiferromagnetic layer 351 made of, for example, PtMn; a pinned layer 352 made of, for example, Co; a nonmagnetic metal layer 353 made of, for example, Cu; a free layer 354 made of, for example, NiFe; and a protective layer 358 made of, for example, Ta. When heat treatment takes place at, for example, 250 degrees centigrade in a state in which the pinned layer 352 and the antiferromagnetic layer 351 are stacked, the orientation of magnetization of the pinned layer 352 is fixed by exchange coupling occurring on the interface between the pinned layer 352 and the antiferromagnetic layer 351. In FIG. 24, the width of the stack 350 (a read width of the MR element 300) corresponding to the track width of the magnetic recording medium (not shown) corresponds to a reproducing track width Tw.

Biasing films for preventing a noise (the so-called Barkhausen noise) by matching the orientation of magnetization of the free layer 354 are provided on both sides of the stack 350 in the direction of the reproducing track width Tw shown in FIG. 24. In the embodiment, each biasing film comprises two layers: one biasing film comprises the biasing ferromagnetic layer 55a and the biasing antiferromagnetic layer 56a stacked on the biasing ferromagnetic layer 55a; and the other biasing film comprises the biasing ferromagnetic layer 55b and the biasing antiferromagnetic layer 56b stacked on the biasing ferromagnetic layer 55b. The MR element 300 corresponds to a specific example of "a magnetic transducer" of the invention. The stack 350 corresponds to a specific example of "a magneto-sensitive layer" of the invention. The heat dissipation layer 360 corresponds to a specific example of "a heat dissipation layer" of the invention. The antiferromagnetic layer 351 corresponds to a specific example of "an antiferromagnetic layer" of the invention. The pinned layer 352 corresponds to a specific example of "a ferromagnetic layer" of the invention. The nonmagnetic metal layer 353 corresponds to a specific example of "a nonmagnetic layer" of the invention. The free layer 354 corresponds to a specific example of "a soft magnetic layer" of the invention.

Figure 25:
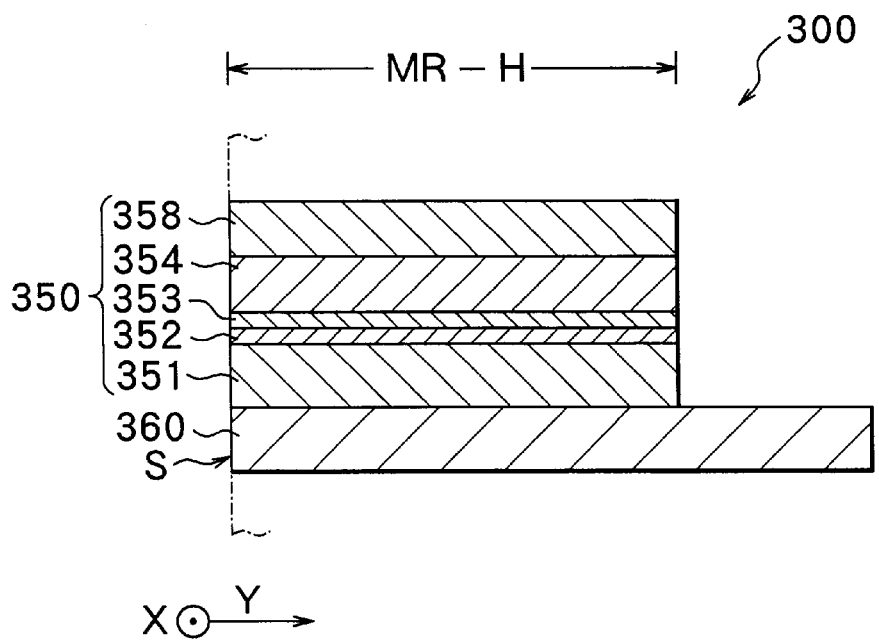
FIG. 25 is a cross sectional view of the MR element shown in FIG. 24, showing a cross section perpendicular to the medium facing surface.

FIG. 25 is a cross sectional view of the MR element 300 taken along the line XXV—XXV of FIG. 24. FIG. 25 shows a cross section perpendicular to the medium facing surface S. On the medium facing surface S of the stack 350, one end (the left end in FIG. 25) of the antiferromagnetic layer 351, the pinned layer 352, the nonmagnetic metal layer 353 and the free layer 354 matches the medium facing surface S. The end face (the right end surface in FIG. 25) opposite to the medium facing surface S of the stack 350 is an end face parallel to the medium facing surface S. The distance from the medium facing surface S of the free layer 354 to the opposite face corresponds to the MR height (indicated by reference symbol MR-H in FIG. 25).

Figure 26:
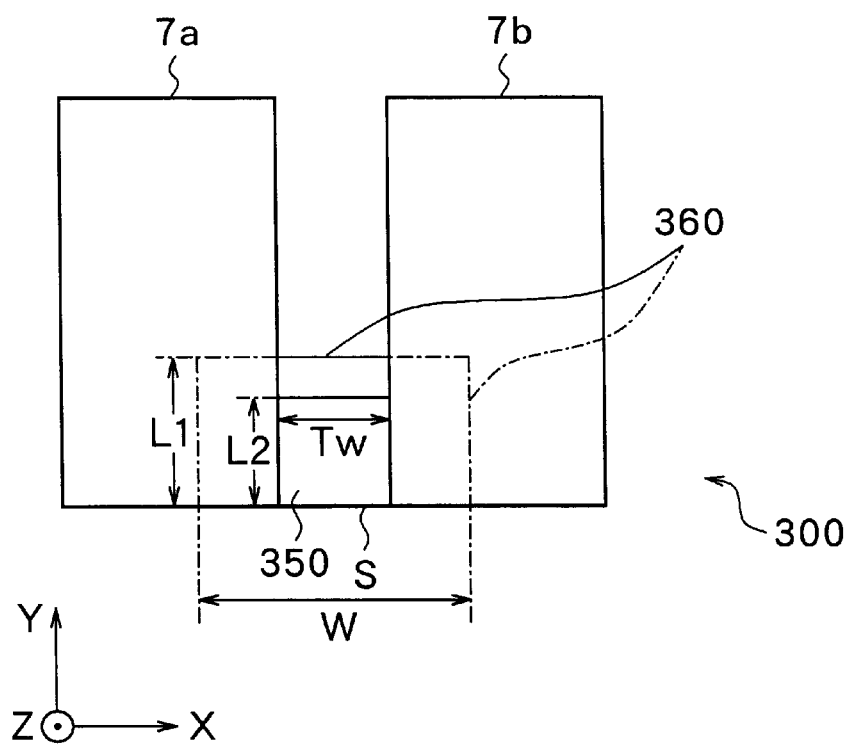
FIG. 26 is a plan view of the MR element shown in FIG. 24.

FIG. 26 is a plan view of the MR element 300 viewed from the direction of arrow XXVI of FIG. 24. As shown in FIG. 26, a surface area of the heat dissipation layer 360 is larger than that of the stack 350. Specifically, a distance L1 between the medium facing surface S of the heat dissipation layer 360 and the opposite face is longer than a distance L2 between the medium facing surface S of the stack 350 and the opposite face. Also, a length W of the heat dissipation layer 360 in the direction of the reproducing track width Tw is longer than the reproducing track width Tw. The thickness of the heat dissipation layer 360 is, for example, from 1 nm to 100 nm inclusive. The distance L1 between the medium facing surface S of the heat dissipation layer 360 and the opposite face is equal to 0.8 $\mu$m. The distance L2 between the medium facing surface S of the stack 350 and the opposite face is equal to 0.3 $\mu$m. The length W of the heat dissipation layer 360 in the direction of the reproducing track width Tw is equal to 1.0 $\mu$m. The reproducing track width Tw is equal to 0.5 $\mu$m.

<Method of Manufacturing Thin Film Magnetic Head>

Next, a method of manufacturing the thin film magnetic head will be described with reference to FIGS. 27 to 40. FIGS. 27 to 33 and FIG. 34A show a cross section perpendicular to the medium facing surface. FIGS. 34B and FIGS. 35 to 40 show an enlarged cross section of a part of the thin film magnetic head, i.e., a part including the MR element 300, parallel to the medium facing surface.

Figure 27:
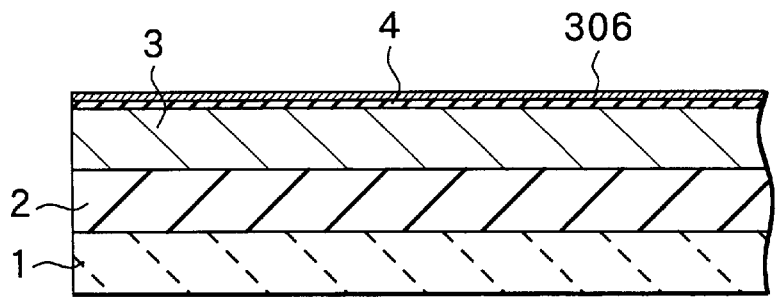
FIG. 27 is a cross sectional view for describing a step of a method of manufacturing the thin film magnetic head according to the third embodiment of the invention.
Figure 28:
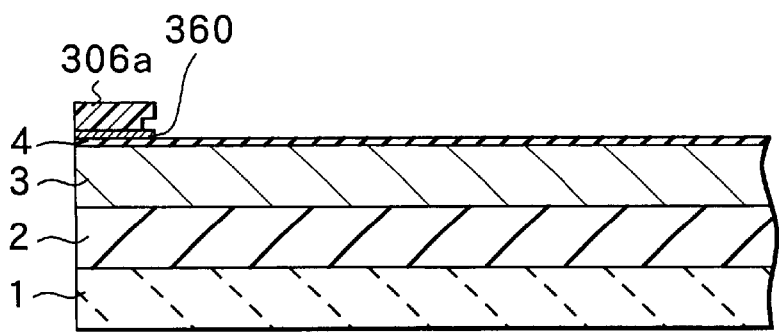
FIG. 28 is a cross sectional view for describing a step following the step of FIG. 27.
Figure 35:
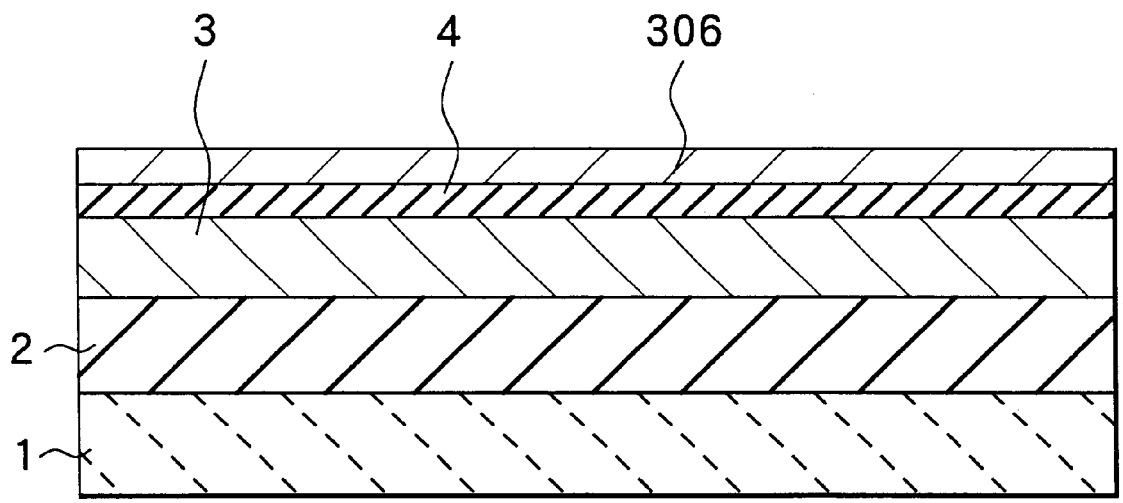
FIG. 35 is a sectional view for describing a step of the method of manufacturing the thin film magnetic head according to the third embodiment of the invention, showing an enlarged cross section parallel to the medium facing surface.
Figure 36:
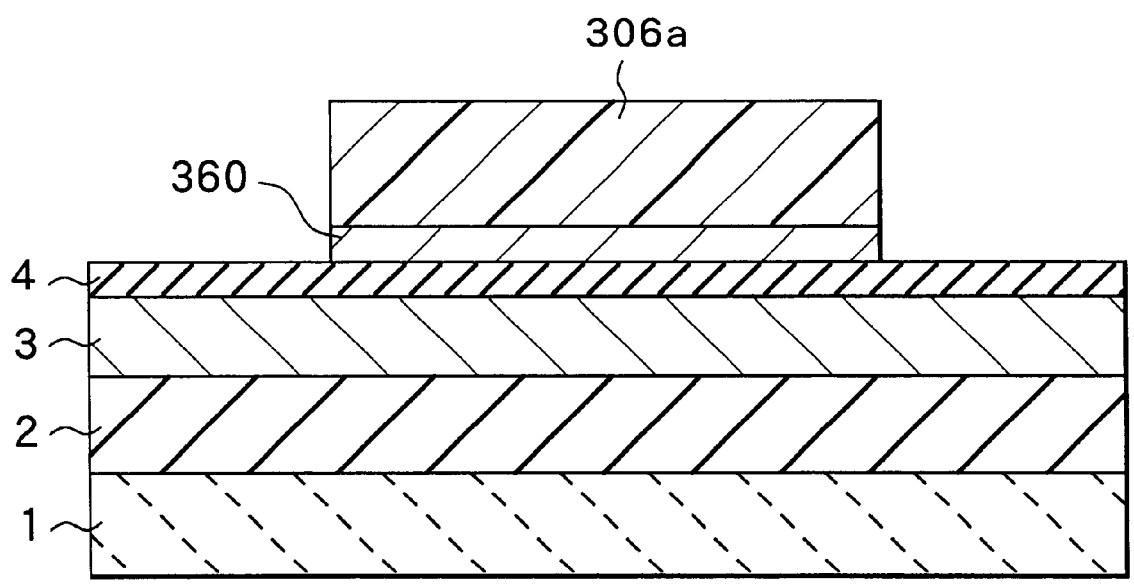
FIG. 36 is an enlarged sectional view for describing a step following the step of FIG. 35.

In the manufacturing method according to the embodiment, first, as shown in FIG. 27, the insulating layer 2, the bottom shield layer 3 and the bottom shield gap layer 4 are sequentially formed on the substrate 1 in the same manner as the first embodiment. Then, as shown in FIG. 35 in enlarged view, nonmagnetic metal of high resistance containing Zr, Bi, Ta, Pt or Pd is deposited with a thickness of 1 nm to 100 nm on the bottom shield gap layer 4 by sputtering, whereby a heat dissipation layer forming film 306 for forming the heat dissipation layer 360 is formed. Then, as shown in FIGS. 28 and 36, a photoresist pattern 306b is formed at a predetermined position on the heat dissipation layer forming film 306. The heat dissipation layer forming film 306 is etched by using the photoresist pattern 306b as a mask, whereby a pattern of the heat dissipation layer 360 is formed.

Figure 29:
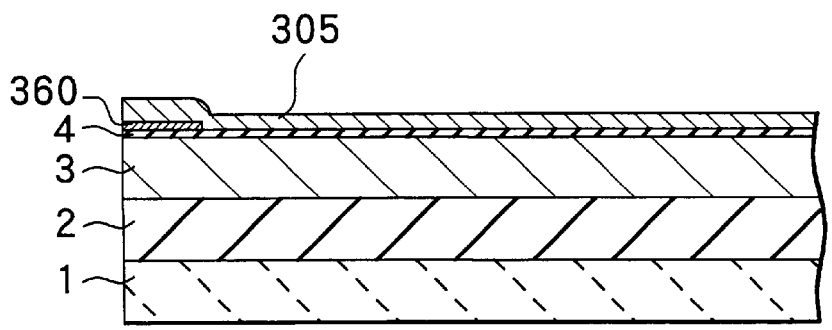
FIG. 29 is a cross sectional view for describing a step following the step of FIG. 28.
Figure 37:
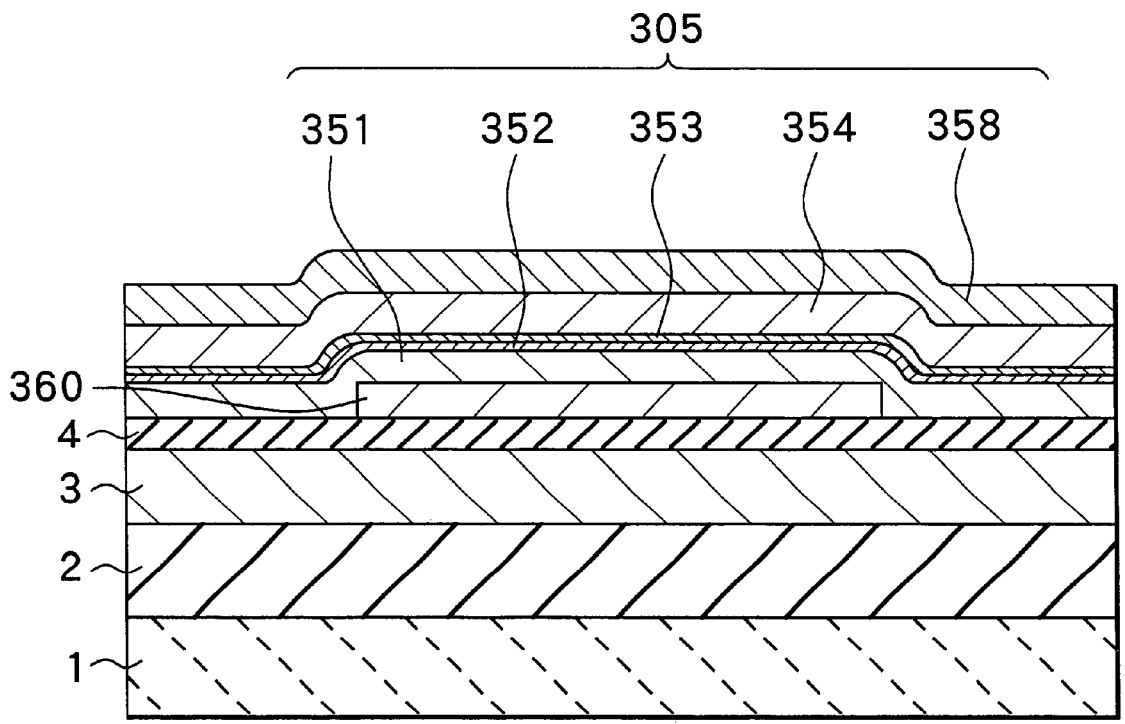
FIG. 37 is an enlarged sectional view for describing a step following the step of FIG. 36.

Then, as shown in FIGS. 29 and 37, a stacked film 305 for forming the stack 350 is formed with a thickness of a few tens of nanometers on the heat dissipation layer 360. Specifically, as shown in FIG. 37 in enlarged view, the antiferromagnetic layer 351, the pinned layer 352, the nonmagnetic metal layer 353, the free layer 354 and the protective layer 358 are stacked in this order on the heat dissipation layer 360 by sputtering, whereby the stacked film 305 is formed. The respective materials and thicknesses of the antiferromagnetic layer 351, the pinned layer 352, the nonmagnetic metal layer 353, the free layer 354 and the protective layer 358 are the same as those of the first embodiment.

Figure 30:
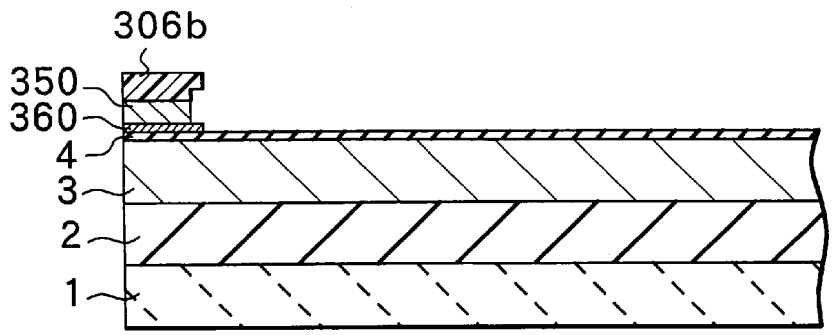
FIG. 30 is a cross sectional view for describing a step following the step of FIG. 29.
Figure 38:
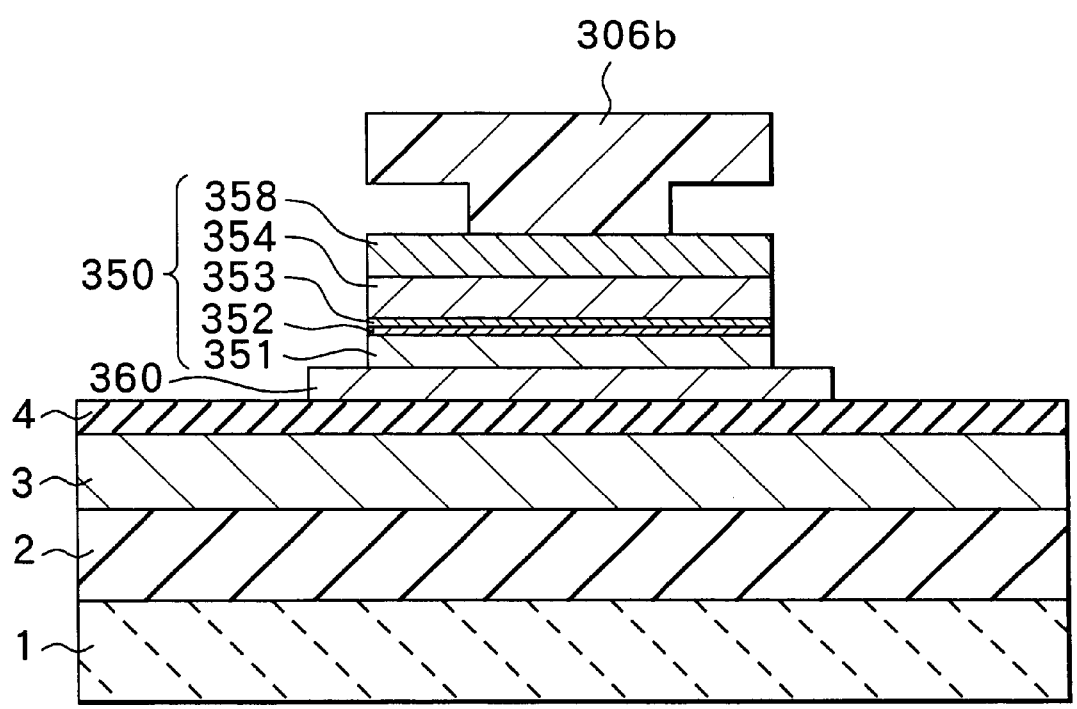
FIG. 38 is an enlarged sectional view for describing a step following the step of FIG. 37.
Figure 39:
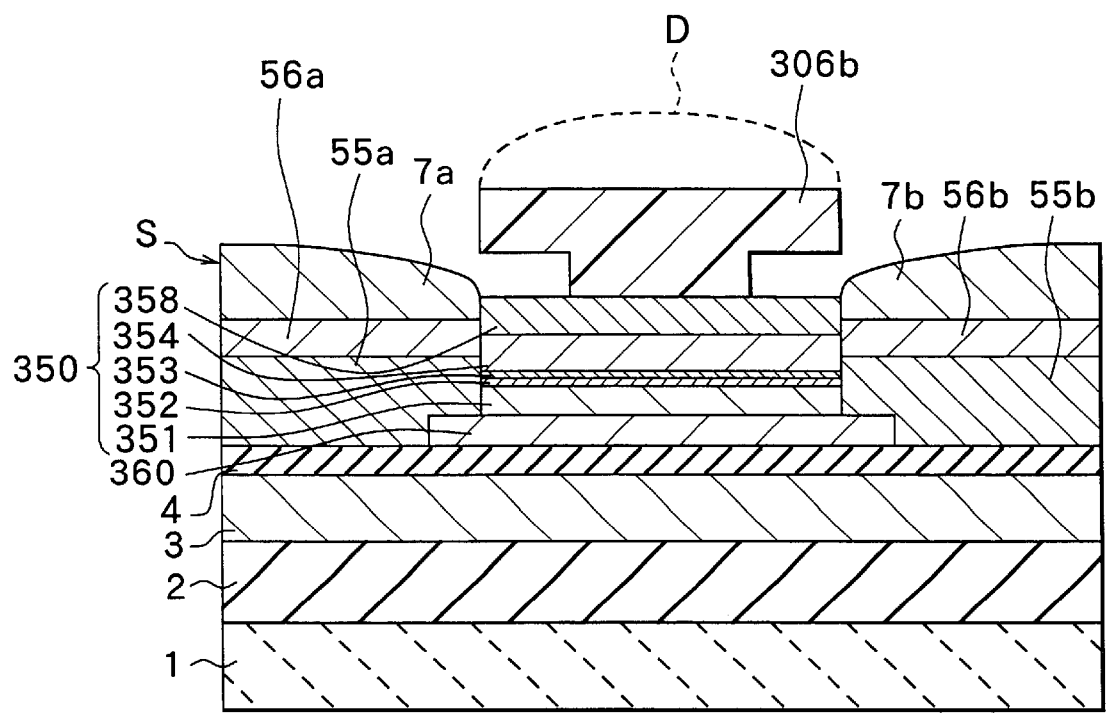
FIG. 39 is an enlarged sectional view for describing a step following the step of FIG. 38.

Then, as shown in FIGS. 30 and 38, a photoresist pattern 306b is selectively formed on the stacked film 305 at a position where the stack 350 is to be formed. The photoresist pattern 306b is, for example, T-shaped in cross section so that lift-off to be described later can be facilitated. The stacked film 305 is vertically etched by means of ion milling using, for example, Ar or the like by using the photoresist pattern 306b as a mask, whereby a pattern of the stack 350 comprising the antiferromagnetic layer 351, the pinned layer 352, the nonmagnetic metal layer 353 and the free layer 354 is formed. Then, as shown in FIG. 39, the biasing ferromagnetic layers 55a and 55b, the biasing antiferromagnetic layers 56a and 56b and the lead layers 7a and 7b, all of which are the same as the first embodiment, are formed on both sides of the stack 350. Then, the photoresist pattern 306b and the deposit D (the respective materials of the biasing ferromagnetic layer, the biasing antiferromagnetic layer and the lead layer) stacked on the photoresist pattern 306b are removed by lift-off.

Figure 31:
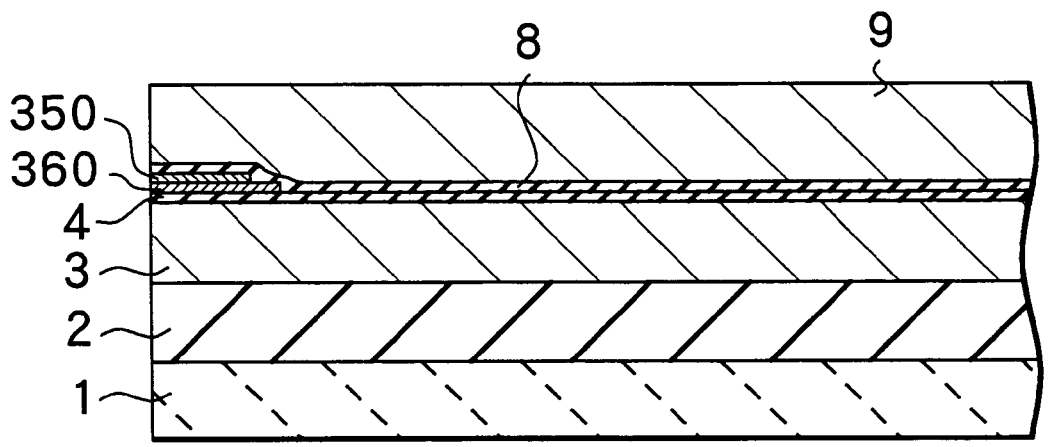
FIG. 31 is a cross sectional view for describing a step following the step of FIG. 30.
Figure 32:
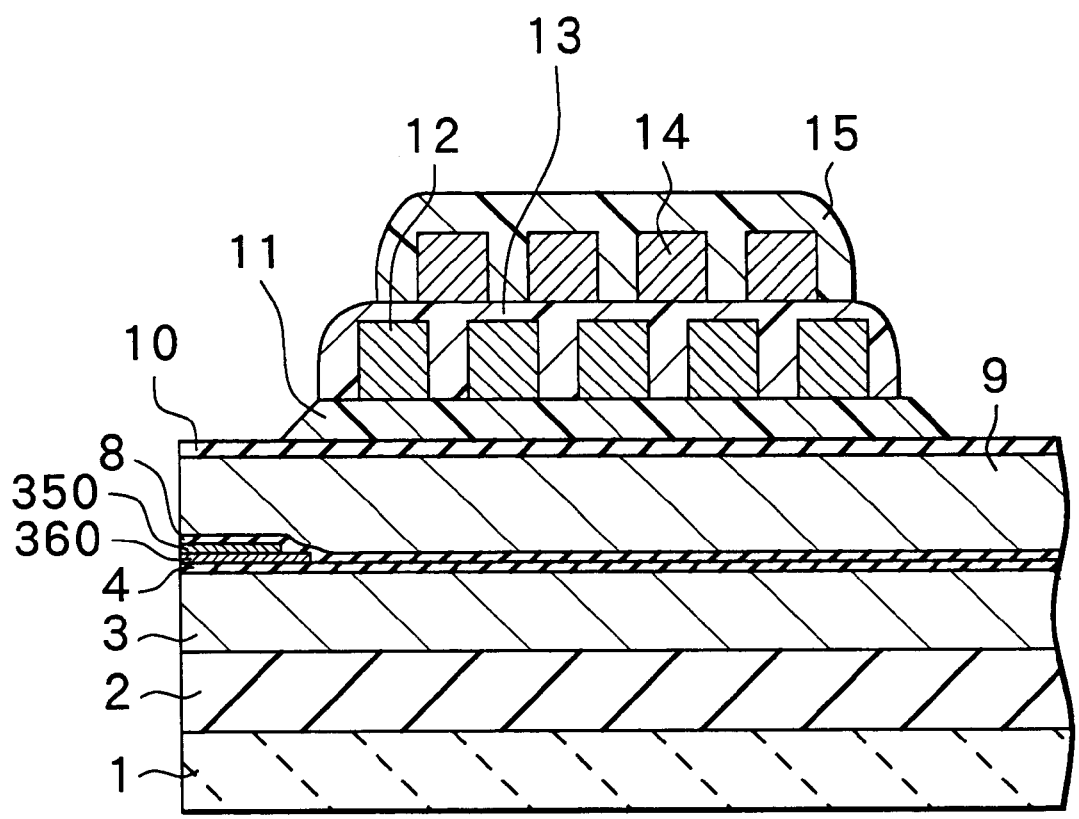
FIG. 32 is a cross sectional view for describing a step following the step of FIG. 31.
Figure 40:
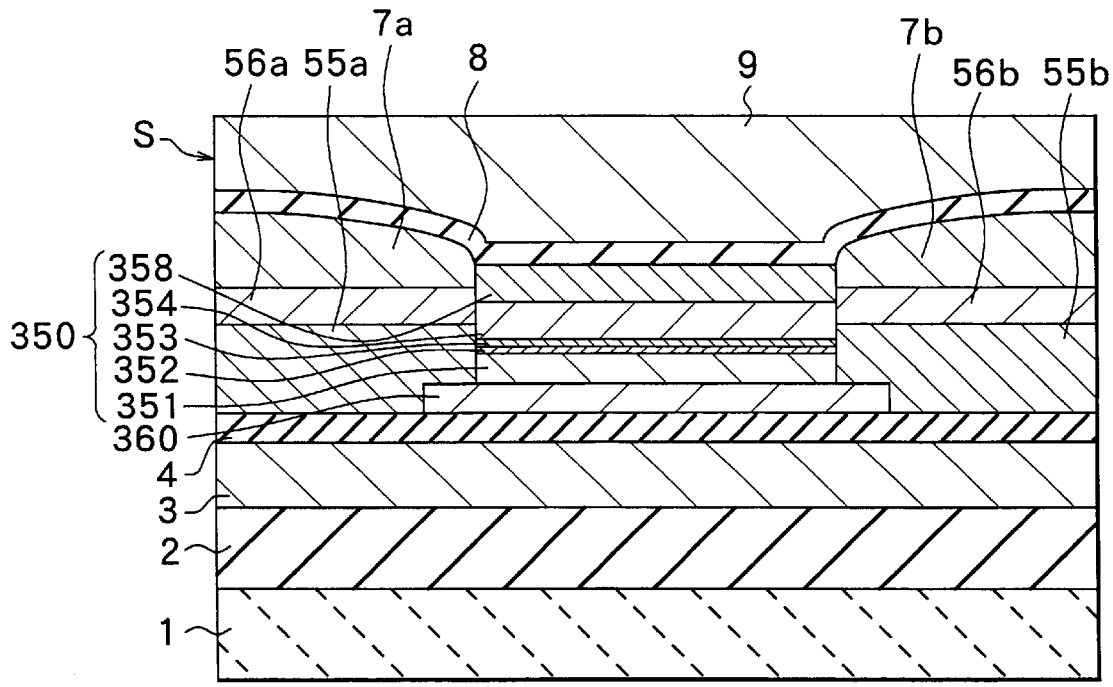
FIG. 40 is an enlarged sectional view for describing a step following the step of FIG. 39.

Then, as shown in FIGS. 31 and 40, the top shield gap layer 8 made of an insulating film such as AlN is formed with a thickness of about 10 nm to 100 nm so as to coat the bottom shield gap layer 4 and the stack 350, whereby the stack 350 and the heat dissipation layer 360 are buried in the shield gap layers 4 and 8. Then, similarly to the first embodiment, the top shield layer 9, the write gap layer 10, the photoresist layer 11, the thin film coils 12, the photoresist layer 13, the thin film coils 14, the photoresist layer 15, the top pole 16 and the overcoat layer 17 are formed on the top shield gap layer 8. Furthermore, similarly to the first embodiment, performed are the processing for causing exchange coupling on the interface between the antiferromagnetic layer 351 and the pinned layer 352 and the processing for causing exchange coupling on the interface between the biasing antiferromagnetic layer 56a and the biasing ferromagnetic layer 55a and the interface between the biasing antiferromagnetic layer 56b and the biasing ferromagnetic layer 55b.

Finally, the medium facing surface S of the recording head and the reproducing head is formed by machining a slider, whereby the thin film magnetic head is completed. A plan view of the thin film magnetic head manufactured as described above is the same as a plan view shown in FIG. 15. As shown in FIG. 34B, the structure, in which the respective side walls of parts of the top pole 16, the write gap layer 10 and the top shield layer 9 (the bottom pole) are vertically formed in self-alignment, is called the trim structure. The trim structure can prevent the increase in the effective track width resulting from the spread of the magnetic flux generated during writing data on the narrow track.

<Operation of Thin Film Magnetic Head>

Next, the operation (the reproducing operation) of the thin film magnetic head configured as described above will be described.

In FIGS. 24 and 25, the orientation of magnetization of the pinned layer 352 is fixed in the Y direction in FIG. 25 by the exchange anisotropic magnetic field generated by exchange coupling occurring on the interface between the pinned layer 352 and the antiferromagnetic layer 351 of the stack 350. The orientation of magnetization of the free layer 354 is matched to the direction of the track width (the X direction in FIG. 24) by the bias magnetic field generated by the biasing ferromagnetic layers 55a and 55b located on both sides of the stack 350. The sense current, which is the direct-current constant current, is passed through the pinned layer 352, the nonmagnetic metal layer 353 and the free layer 354 through the lead layers 7a and 7b in the X direction in FIG. 24. On receiving the signal magnetic field from the magnetic recording medium, the orientation of magnetization of the free layer 354 changes. Electrical resistance changes in accordance with the relative angle between the orientation of magnetization of the free layer 354 and the (fixed) orientation of magnetization of the pinned layer 352, and thus the change in electrical resistance is detected as the voltage change.

At this time, the sense current passes through the stack 350, whereby Joule's heat is generated. Joule's heat is mainly generated by the current passing through the pinned layer 352, the nonmagnetic metal layer 353 and the free layer 354. Because of heat transfer, Joule's heat is transferred to the heat dissipation layer 360 through a boundary surface between the stack 350 and the heat dissipation layer 360, and Joule's heat is further transferred to the bottom shield gap layer 4 (and the bottom shield layer 3 under the bottom shield gap layer 4) through a boundary surface between the heat dissipation layer 360 and the bottom shield gap layer 4.

In the embodiment, the heat dissipation layer 360 made of a material having relatively high thermal conductivity is adjacent to the stack 350. Thus, heat in the stack 350 is easily transferred to the heat dissipation layer 360. Additionally, the surface area of the heat dissipation layer 360 is larger than that of the stack 350. Thus, heat is transferred through the larger boundary surface (the boundary surface between the stack 350 and the heat dissipation layer 360 and the boundary surface between the heat dissipation layer 360 and the bottom shield gap layer 4). Therefore, the efficiency of heat dissipation of the MR element 300 improves.

Detection of the signal magnetic field is performed in accordance with a variation in the orientation of magnetization of the free layer 354. Therefore, the reproducing track width Tw and the MR height of the MR element 300 can be reduced in accordance with the track width of the magnetic recording medium in order to adapt to the increase in the density of the magnetic recording medium. In the embodiment, the heat dissipation area (the area of the boundary surface through which heat is transferred) can be ensured by the heat dissipation layer 360 even if the free layer 354 is reduced in size. In short, the efficiency of heat dissipation of the MR element can be improved while adapting to high-density recording.

<Effect of Heat Dissipation Layer>

Figure 41:
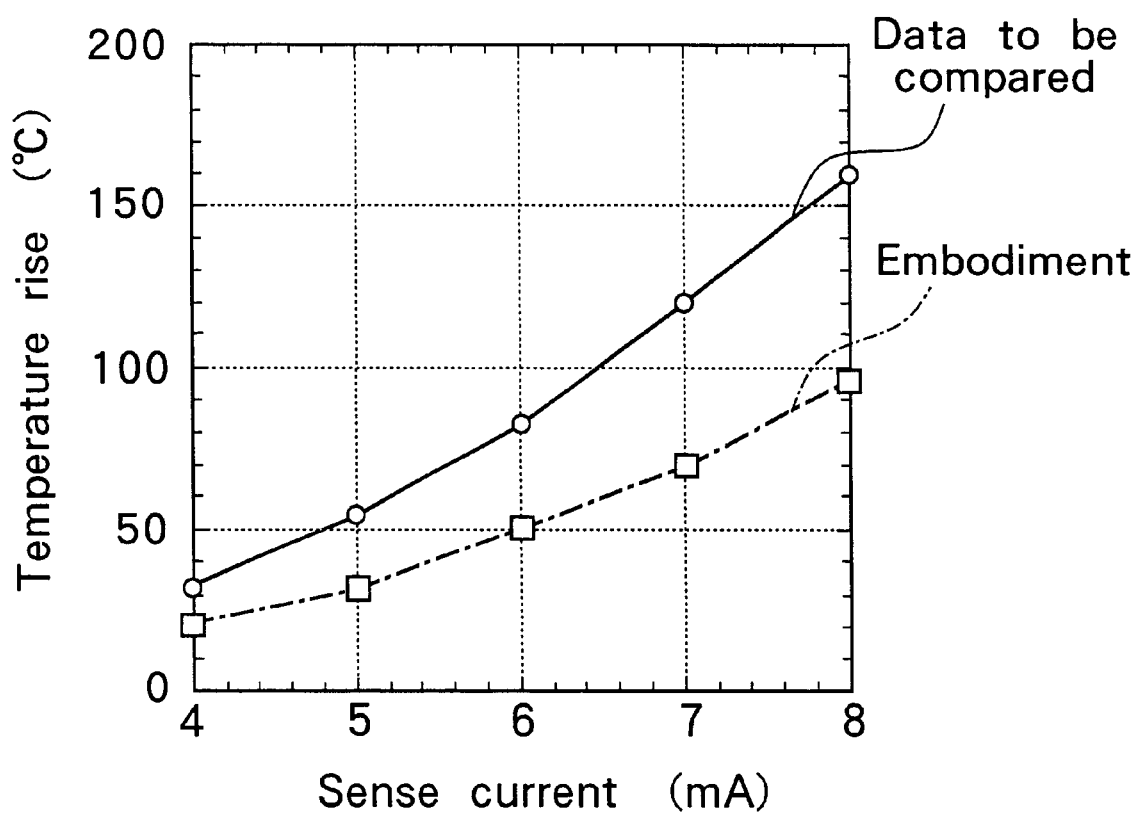
FIG. 41 is a plot of experimental results of a heat dissipation effect of the third embodiment of the invention.

FIG. 41 shows the result of measurement of a rise in the temperature of the MR element 300 of the embodiment through which a current of 4 mA to 8 mA is passed. The thickness of the heat dissipation layer 360 is equal to 10 nm, and the length of the heat dissipation layer 360 in the direction of the reproducing track width is equal to 1.0 μm. The distance between the medium facing surface S of the heat dissipation layer 360 and the opposite face is equal to 0.8 μm and is 0.5 μm longer than the distance between the medium facing surface S of the stack 350 and the opposite face. FIG. 41 also shows experimental data on the MR element in which the heat dissipation layer 360 is not provided, as data to be compared.

As shown in FIG. 41, the heat dissipation layer 360 is provided between the stack 350 and the bottom shield gap layer 4, whereby the temperature rise can be reduced by about 40%.

<Optimum Thickness of Heat Dissipation Layer>

Figure 42:
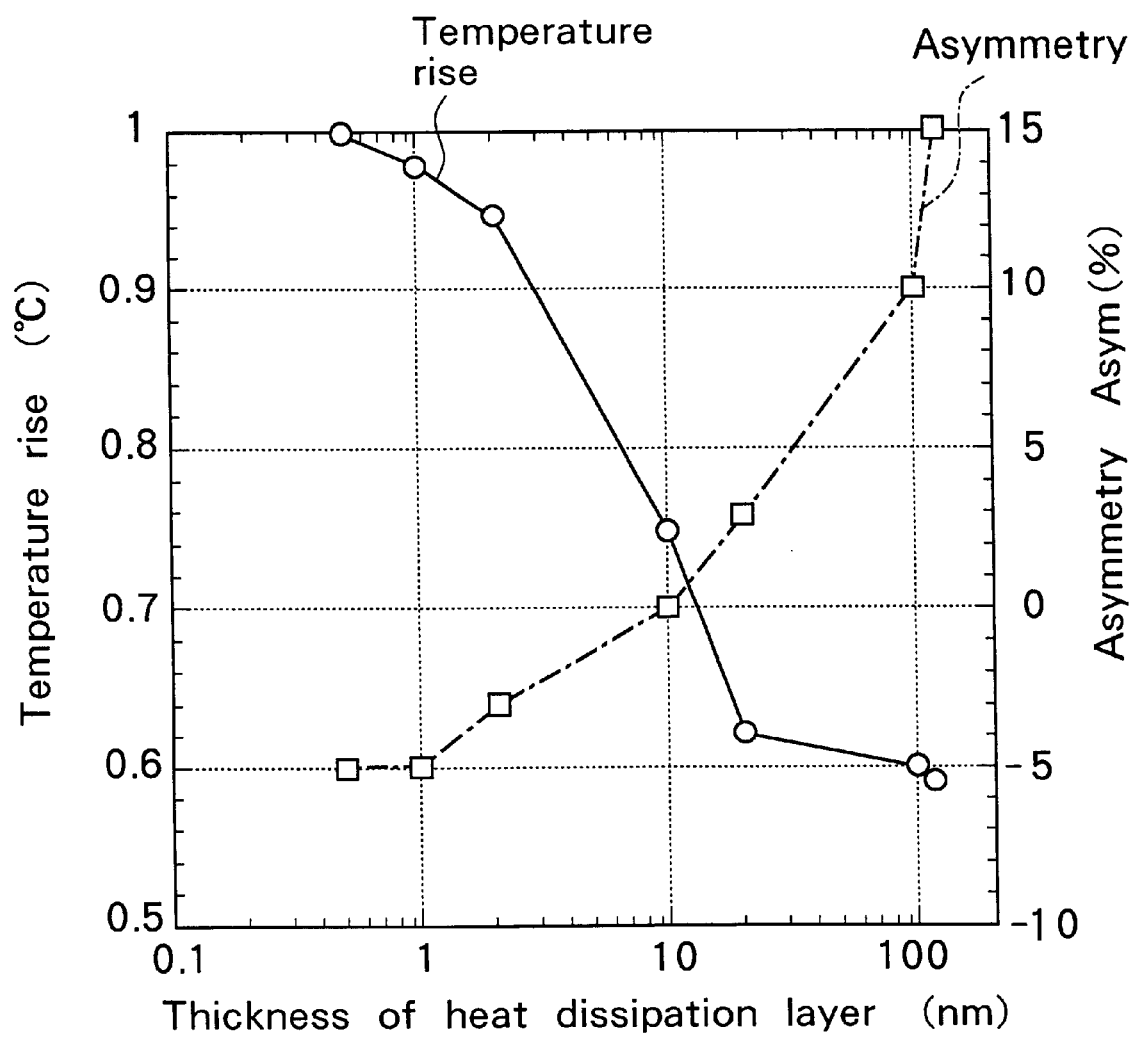
FIG. 42 is a plot of experimental results of the heat dissipation effect and asymmetry of the third embodiment of the invention.

FIG. 42 is a plot of a correlation between the thickness of the heat dissipation layer 360 and the rise in the temperature of the MR element. In FIG. 42, the temperature rise is expressed as a relative value to the temperature rise (° C.) which occurs when the thickness of the stack 350 is equal to 0.5 nm. In FIG. 42, a direct-current constant current of 6 MA is passed through the MR element 300.

FIG. 42 also shows asymmetry of a plus output and a minus output of a read output (a voltage output) of the MR element 300 when the magnetic fields (S and N) from the magnetic recording medium are switched in a state in which the thin film magnetic head is caused to face the magnetic recording medium. The asymmetry Asym is determined by equation (1) described by referring to the first embodiment. Generally, the MR element requires the asymmetry which is limited so as to fall within a range of ±10%.

As shown in FIG. 42, when the thickness of the heat dissipation layer 360 is less than 1 nm, little heat dissipation effect of the MR element 300 is achieved. On the other hand, when the thickness of the heat dissipation layer 360 is more than 100 nm, the asymmetry exceeds 10% (it is possible that this occurs because of an influence of the magnetic field generated by the sense current diverted to the heat dissipation layer 360). It is therefore desirable that the thickness of the heat dissipation layer 360 is within a range of from 1 nm to 100 nm.

As described above, according to the embodiment, the heat dissipation layer 360 is adjacent to the stack 350 of the MR element 300. Therefore, the area of the heat dissipation layer 360 required for heat dissipation can be ensured while reducing the MR height and the like of the MR element 300 in accordance with the track width of the magnetic recording medium. In other words, the efficiency of heat dissipation can be improved while adapting to the increase in the density of the magnetic recording medium.

Joule's heat of the MR element 300 is generated, particularly, at the center of the stack 350 in the direction of the track width. In the embodiment, the distance between the medium facing surface S of the heat dissipation layer 360 and the opposite face is longer. Therefore, heat generated at the center of the stack 350 can be efficiently dissipated, compared to the case where the length of the heat dissipation layer 360 is longer in the direction of the reproducing track width.

Furthermore, the heat dissipation layer 360 is made of a nonmagnetic metal film having higher resistance than the resistance of the stack 350. Therefore, a relatively small sense current is diverted to the heat dissipation layer 360.

Fourth Embodiment

Next, an MR element 400 according to a fourth embodiment of the invention will be described. The fourth embodiment differs from the third embodiment in that a heat dissipation layer is provided on a stack, but the other configuration of the fourth embodiment is the same as that of the third embodiment. Only a difference between the third and fourth embodiments will be described below, and the description of the other configuration is omitted.

Figure 43:
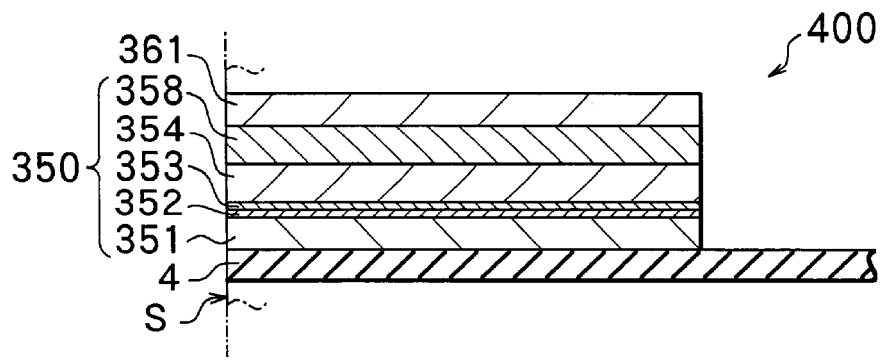
FIG. 43 is a cross sectional view of an MR element according to a fourth embodiment of the invention, showing a cross section perpendicular to the medium facing surface.

FIG. 43 shows a sectional structure of the stack and the heat dissipation layer of the MR element 400 of the fourth embodiment. FIG. 43 shows a cross section perpendicular to the medium facing surface S (i.e., a cross section corresponding to a cross section of the third embodiment shown in FIG. 25). A heat dissipation layer 361 is formed on the stack 350. The heat dissipation layer 361 is made of nonmagnetic metal of high resistance (Zn, Bi, Ta, Pt, Pd or the like), similarly to the heat dissipation layer 360 of the first embodiment. The surface area of the heat dissipation layer 361 is identical with that of the stack 350.

Figure 44:
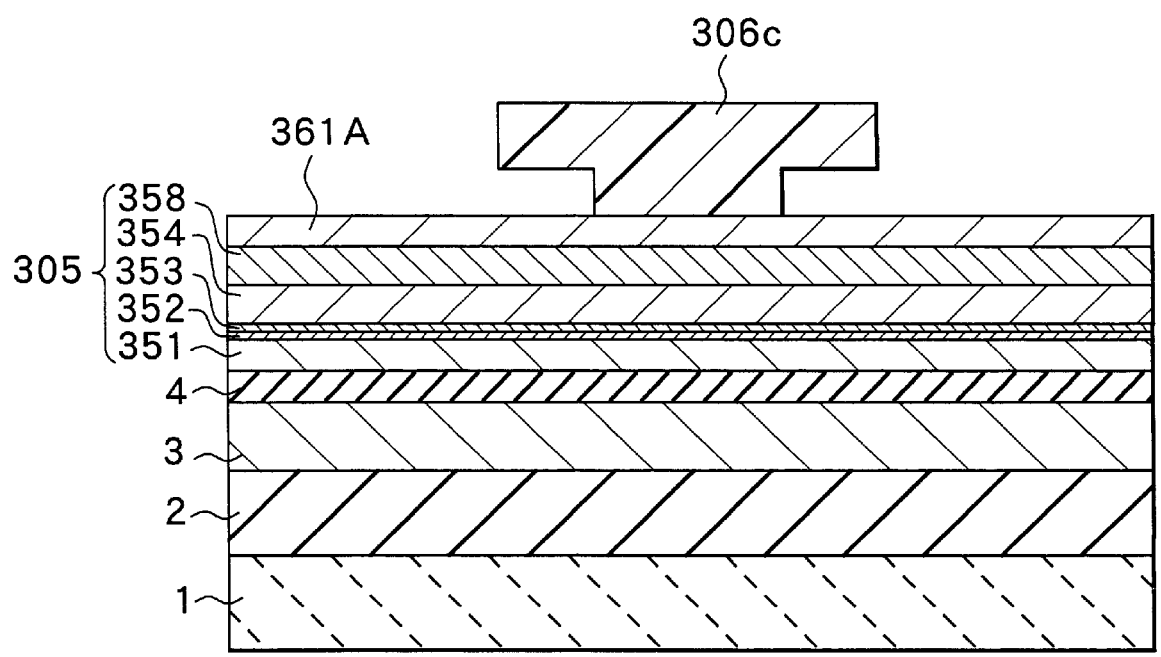
FIG. 44 is an enlarged sectional view for describing a step of a method of manufacturing the MR element shown in FIG. 43.

FIG. 44 shows a step of a method of manufacturing the MR element of the fourth embodiment. As shown in FIG. 44, similarly to the third embodiment, the insulating layer 2, the bottom shield layer 3 and the bottom shield gap layer 4 are stacked on the substrate 1. Furthermore, the stacked film 305 for forming the stack 350 is formed on the bottom shield gap layer 4. The structure of the stacked film 305 is the same as that of the third embodiment.

Then, a heat dissipation layer forming film 361A made of nonmagnetic metal of high resistance (Zn, Bi, Ta, Pt or Pd) is formed with a thickness of 1 nm to 100 nm on the stacked film 305 by sputtering. Then, a photoresist pattern 306c is formed at a predetermined position on the heat dissipation layer forming film 361A. The heat dissipation layer forming film 361A is etched by using the photoresist pattern 306c as a mask, whereby the heat dissipation layer 361 shown in FIG. 43 is formed. Thus, it is possible to obtain the structure in which the heat dissipation layer 361 is formed on the stack 350. After that, the thin film magnetic head is completed through the same steps as the steps of the third embodiment shown in FIG. 29 to FIGS. 34A and 34B.

According to the embodiment, heat generated in the stack 350 of the MR element is transferred to the top shield gap layer 8 and the top shield layer 9 through the heat dissipation layer 361. Therefore, obtained is the same effect as the effect of the third embodiment, i.e., the effect of being able to improve the efficiency of heat dissipation.

Fifth Embodiment

Next, an MR element according to a fifth embodiment of the invention will be described. The fifth embodiment differs from the third embodiment in that a stack is sandwiched between two heat dissipation layers, but the other configuration of the fifth embodiment is the same as that of the third embodiment. Only a difference between the third and fifth embodiments will be described below, and the description of the other configuration is omitted.

Figure 45:
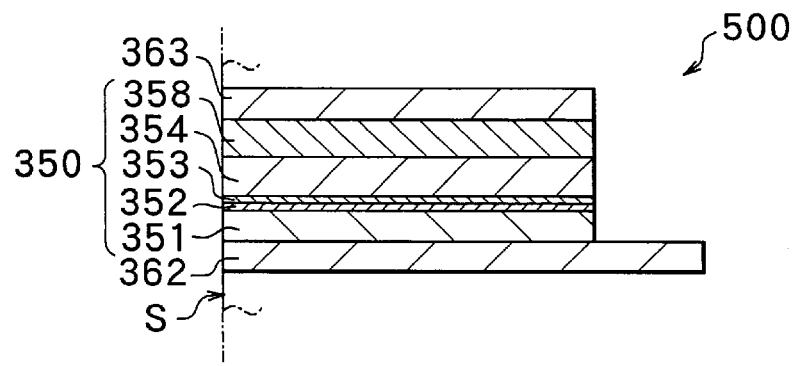
FIG. 45 is a cross sectional view of an MR element according to a fifth embodiment of the invention, showing a cross section perpendicular to a the medium facing surface.

FIG. 45 shows a sectional structure of the stack and the heat dissipation layers of an MR element 500 of the fifth embodiment. FIG. 45 shows a cross section perpendicular to the medium facing surface S (i.e., a cross section corresponding to a cross section of the third embodiment shown in FIG. 25). In the embodiment, a first heat dissipation layer 362 is formed under the stack 350, and a second heat dissipation layer 363 is formed on the stack 350. Similarly to the heat dissipation layer 360 of the first embodiment, the first and second heat dissipation layers 362 and 363 are made of nonmagnetic metal of high resistance (Zr, Bi, Ta, Pt, Pd or the like) and are each formed with a thickness of 1 nm to 100 nm. The surface area of the first heat dissipation layer 362 is identical with that of the heat dissipation layer 360 of the first embodiment (see FIG. 26) and is larger than that of the stack 350. On the other hand, the surface area of the second heat dissipation layer 363 is identical with that of the stack 350.

Figure 46:
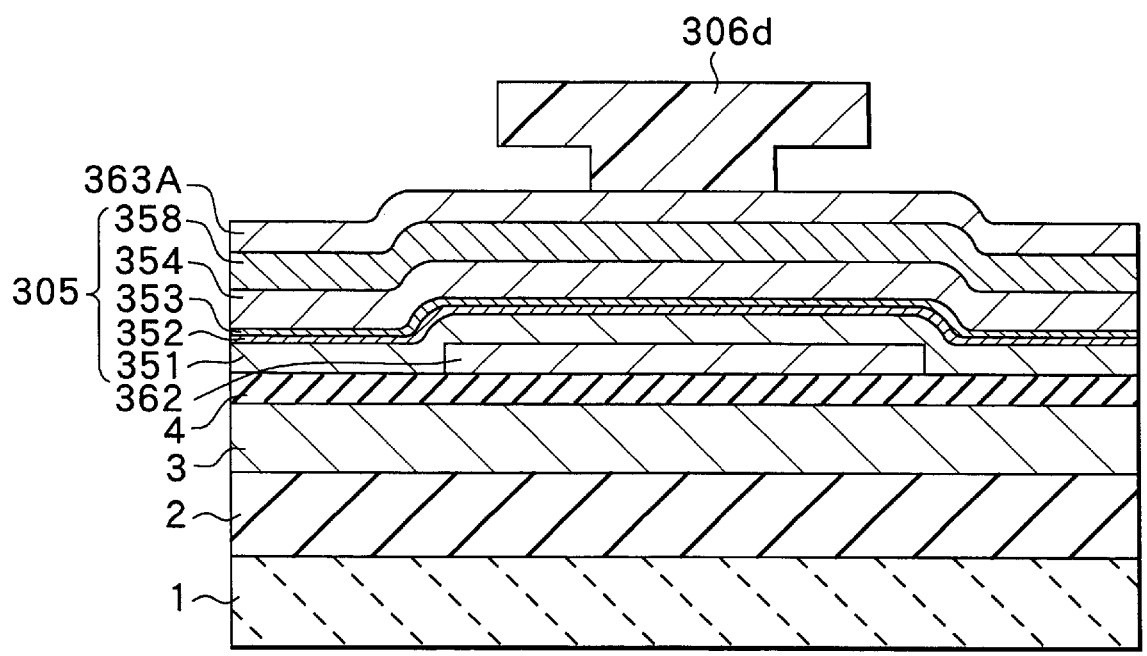
FIG. 46 is an enlarged sectional view for describing a step of a method of manufacturing the MR element shown in FIG. 45.

FIG. 46 shows a step of a method of manufacturing the MR element 500 of the fifth embodiment. As shown in FIG. 46, similarly to the third embodiment, the insulating layer 2, the bottom shield layer 3 and the bottom shield gap layer 4 are stacked on the substrate 1. Furthermore, in the same manner as the first embodiment, a pattern of the first heat dissipation layer 362 made of nonmagnetic metal of high resistance (Zr, Bi, Ta, Pt or Pd) is formed on the bottom shield gap layer 4.

Then, the stacked film 305 for forming the stack 350 is formed so as to coat the first heat dissipation layer 362 and the bottom shield gap layer 4. The structure of the stacked film 305 is the same as that of the first embodiment. Furthermore, a heat dissipation layer forming film 363A made of nonmagnetic metal of high resistance (Zr, Bi, Ta, Pt or Pd), for forming the second heat dissipation layer 363 is stacked with a thickness of 1 nm to 100 nm on the stacked film 305 by sputtering. Then, a photoresist pattern 306d is formed on the heat dissipation layer forming film 363A at a position where the heat dissipation layer 363 is to be formed. The heat dissipation layer forming film 363A is etched by using the photoresist pattern 306d as a mask, whereby the second heat dissipation layer 363 shown in FIG. 45 is formed. Thus, it is possible to form the structure in which the stack 350 is sandwiched between the two heat dissipation layers 362 and 363. After that, the thin film magnetic head is completed through the same steps as the steps of the third embodiment shown in FIG. 29 to FIGS. 34A and 34B.

According to the embodiment, heat generated in the stack 350 of the MR element is transferred to the top shield gap layer 8, the top shield layer 9, the bottom shield gap layer 4 and the bottom shield layer 3 through the bottom and top heat dissipation layers 362 and 363. Therefore, the effect of further improving the efficiency of heat dissipation is obtained compared to the first embodiment.

Sixth Embodiment

Next, an MR element according to a sixth embodiment of the invention will be described. The MR element of the sixth embodiment differs from that of the third embodiment in that the MR element has an insulating layer between an antiferromagnetic layer and a heat dissipation layer, but the other configuration of the sixth embodiment is the same as that of the third embodiment. Only a difference between the third and sixth embodiments will be described below, and the description of the other configuration is omitted.

Figure 47:
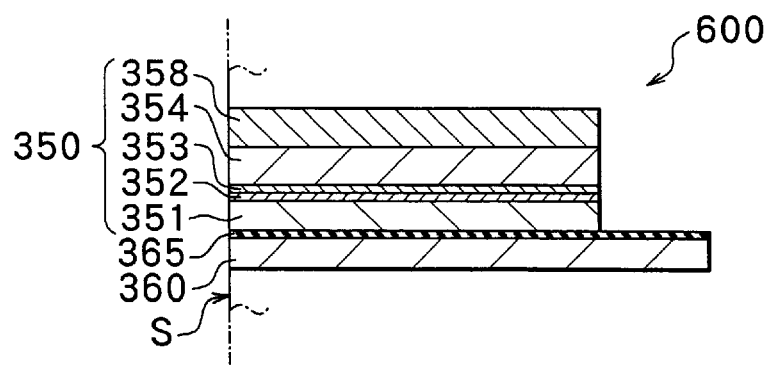
FIG. 47 is a cross sectional view of an MR element according to a sixth embodiment of the invention, showing a cross section parallel to the medium facing surface.

FIG. 47 shows a sectional structure of the stack and the heat dissipation layer of the MR element of the sixth embodiment. FIG. 47 shows a cross section perpendicular to the medium facing surface S (i.e., a cross section corresponding to a cross section of the third embodiment shown in FIG. 25). In the embodiment, an insulating layer 365 for preventing a diversion of a sense current to the heat dissipation layer 360 is formed on the surface of the heat dissipation layer 360 close to the stack 350. The insulating layer 365 is composed of an oxide layer formed by plasma oxidation of the surface of the heat dissipation layer 360 made of the above-mentioned nonmagnetic metal of high resistance. Desirably, the thickness of the insulating layer 365 is 2 nm to 30 nm. When the thickness of the insulating layer 365 is less than 2 nm, it is difficult to prevent the diversion of the sense current to the heat dissipation layer 360. When the thickness of the insulating layer 365 is more than 30 nm, the insulating layer 365 interferes with heat transfer from the antiferromagnetic layer 351 to the heat dissipation layer 360. The insulating layer 365 may be made of an oxide film such as $Al_2O_3$ or $SiO_2$.

Figure 48:
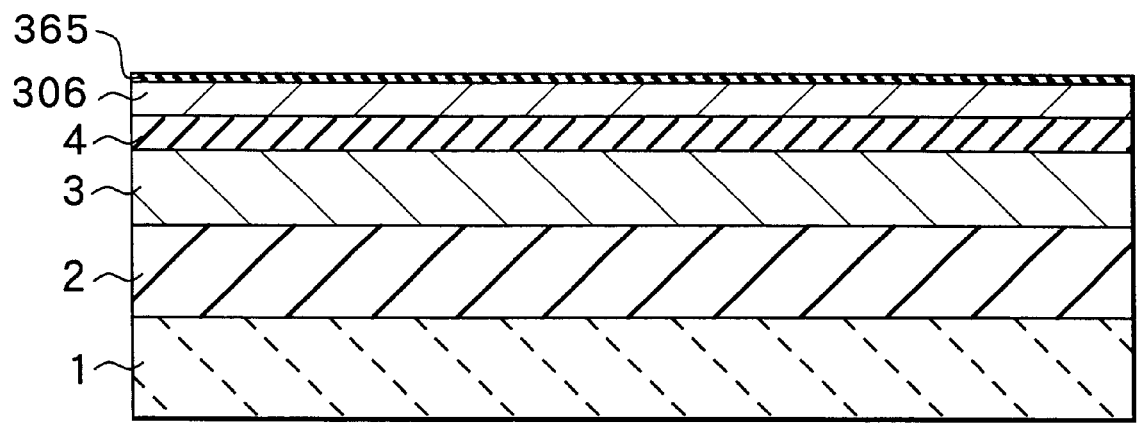
FIG. 48 is an enlarged sectional view for describing a step of a method of manufacturing the MR element shown in FIG. 47.
Figure 49:
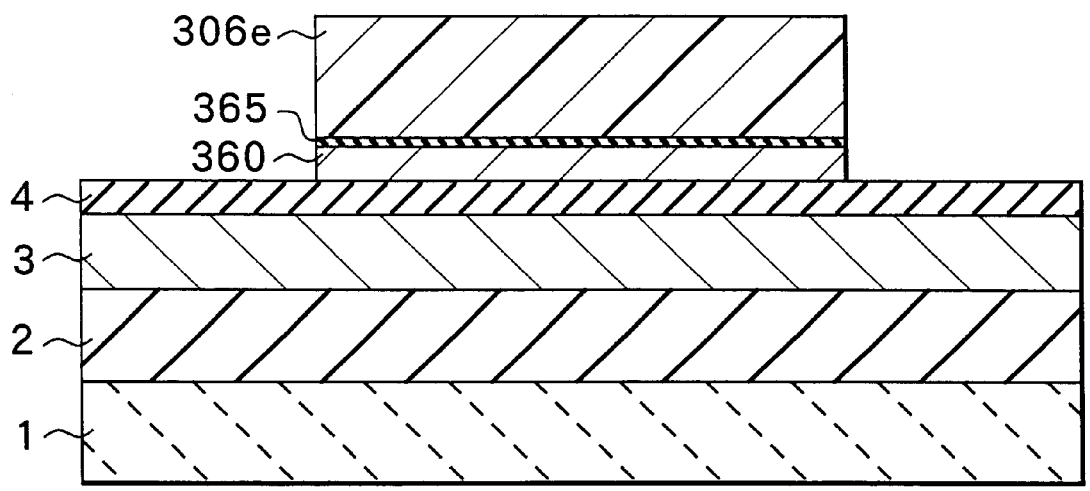
FIG. 49 is an enlarged sectional view for describing a step following the step of FIG. 48.
Figure 50:
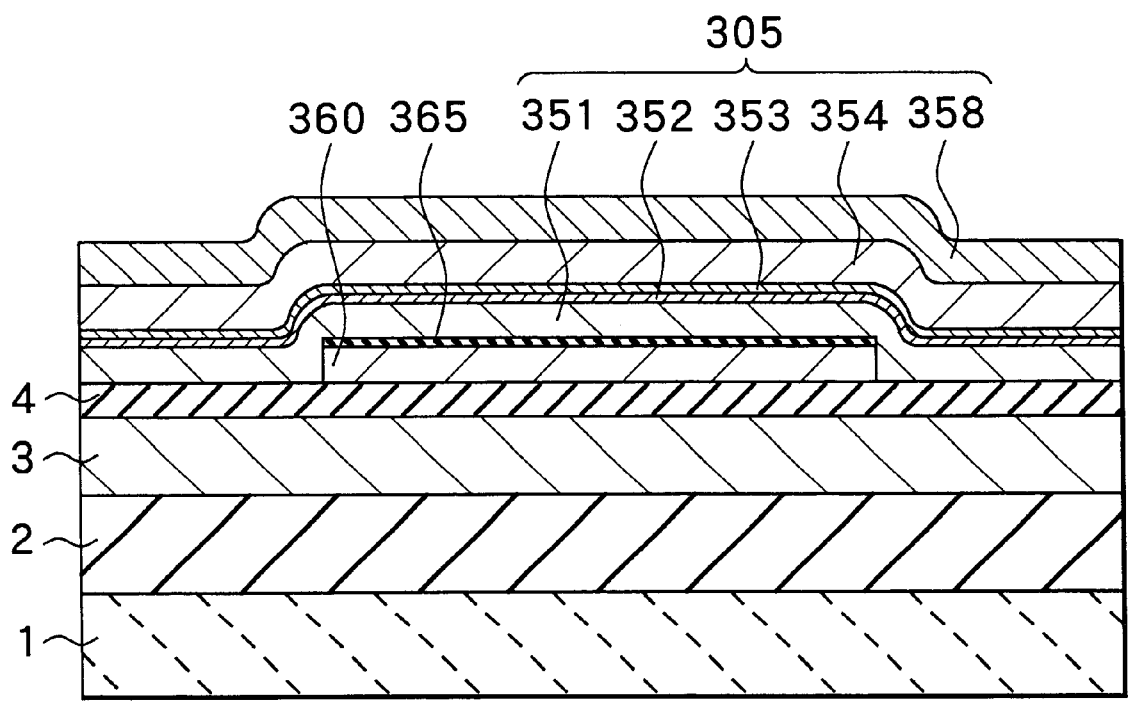
FIG. 50 is an enlarged sectional view for describing a step following the step of FIG. 49.

FIGS. 48 to 50 show a method of manufacturing the MR element of the sixth embodiment. First, as shown in FIG. 48, similarly to the third embodiment, the insulating layer 2, the bottom shield layer 3 and the bottom shield gap layer 4 are stacked on the substrate 1. The heat dissipation layer forming film 306 made of nonmagnetic metal of high resistance (Zr, Bi, Ta, Pt or Pd) is formed on the bottom shield gap layer 4. Then, the surface of the heat dissipation layer forming film 306 is subjected to plasma oxidation, whereby the insulating layer 365 of 2 nm to 30 nm thick is formed.

Then, as shown in FIG. 49, a photoresist pattern 306e is formed at a predetermined position on the heat dissipation layer forming film 306. The insulating layer 365 and the heat dissipation layer forming film 306 are etched by using the photoresist pattern 306e as a mask, whereby the heat dissipation layer 360 having the insulating layer 365 on the top surface thereof is formed. Then, as shown in FIG. 50, the stacked film 305 for forming the stack 350 is formed so as to coat the insulating layer 365 and the bottom shield gap layer 4. The structure of the stacked film 305 is the same as that of the third embodiment. After that, the thin film magnetic head is completed through the same steps as the steps of the third embodiment shown in FIG. 29 to FIGS. 34A and 34B.

According to the embodiment, heat generated in the stack 350 is dissipated to the bottom shield gap layer 4 and the bottom shield layer 3 through the heat dissipation layer 360 having a large surface area. Therefore, obtained is the same effect as the effect of the first embodiment, i.e., the effect of being able to ensure necessary efficiency of heat dissipation even if the MR element is reduced in size. Furthermore, the insulating layer 365 is interposed between the stack 350 and the heat dissipation layer 360. Therefore, obtained is an effect of being able to prevent the diversion of the sense current to the heat dissipation layer 360 and thus able to reduce waste of power.

Seventh Embodiment

Next, a seventh embodiment of the invention will be described. A stack of an MR element of the seventh embodiment differs from that of the third embodiment in that the surface of the stack opposite to the medium facing surface is inclined to the medium facing surface, but the other configuration of the seventh embodiment is the same as that of the third embodiment. Only a difference between the third and seventh embodiments will be described below, and the description of the other configuration is omitted.

Figure 51:
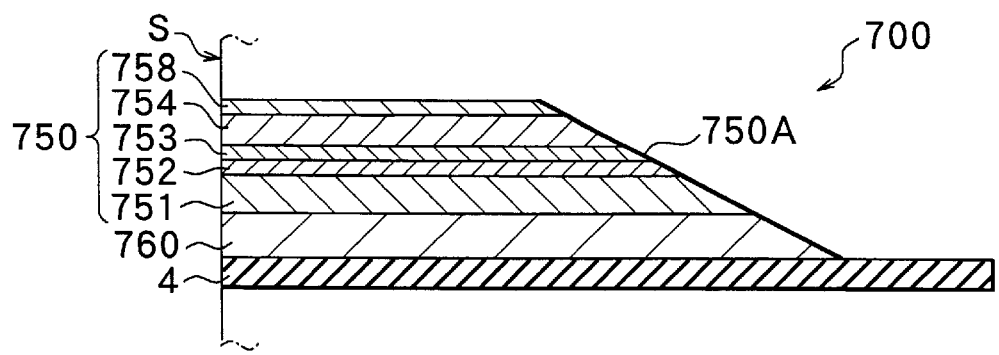
FIG. 51 is a cross sectional view of an MR element according to a seventh embodiment of the invention, showing a cross section perpendicular to the medium facing surface.

FIG. 51 shows a sectional structure of the stack and the heat dissipation layer of an MR element 700 of the seventh embodiment. FIG. 51 shows a cross section perpendicular to the medium facing surface S (i.e., a cross section corresponding to a cross section of the third embodiment shown in FIG. 25). A heat dissipation layer 760 made of nonmagnetic metal of high resistance (Zr, Bi, Ta, Pt or Pd) is formed on the bottom shield gap layer 4. An antiferromagnetic layer 751 made of, for example, PtMn; a pinned layer 752 made of, for example, Co; a nonmagnetic metal layer 753 made of, for example, Cu; a free layer 754 made of, for example, NiFe; and a protective layer 758 made of, for example, Ta are stacked in sequence on the heat dissipation layer 760.

The end face (the right end surface in FIG. 51) of a stack 750 opposite to the medium facing surface S is formed as a tapered surface 750A. The tapered surface 750A is formed so that the free layer 754, the nonmagnetic metal layer 753, the pinned layer 752, the antiferromagnetic layer 751 and the heat dissipation layer 760 may have the distance between the medium facing surface S and the opposite face which becomes longer in this order.

Figure 52:
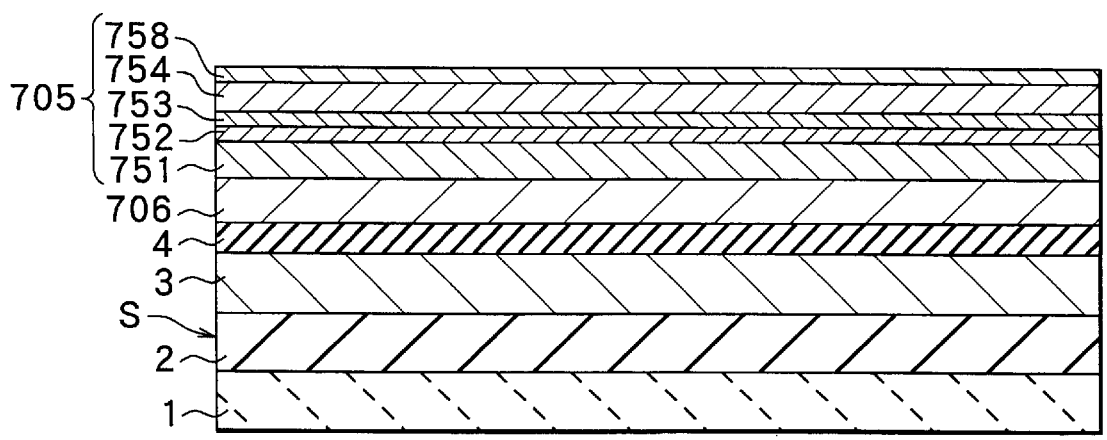
FIG. 52 is an enlarged sectional view for describing a step of a method of manufacturing the MR element shown in FIG. 51.
Figure 53:
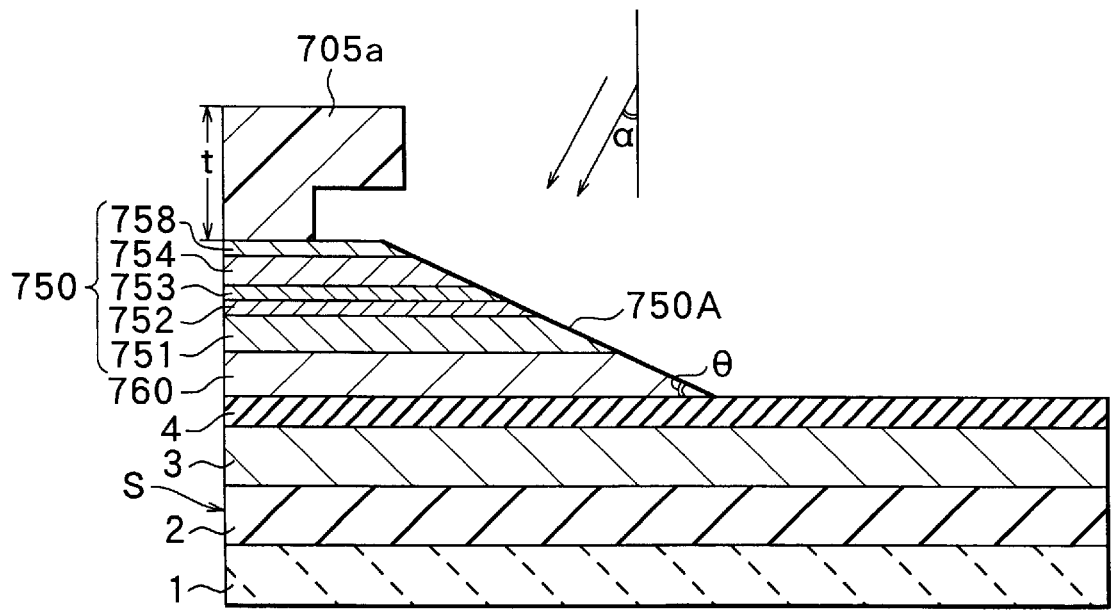
FIG. 53 is an enlarged sectional view for describing a step following the step of FIG. 52.
Figure 54:
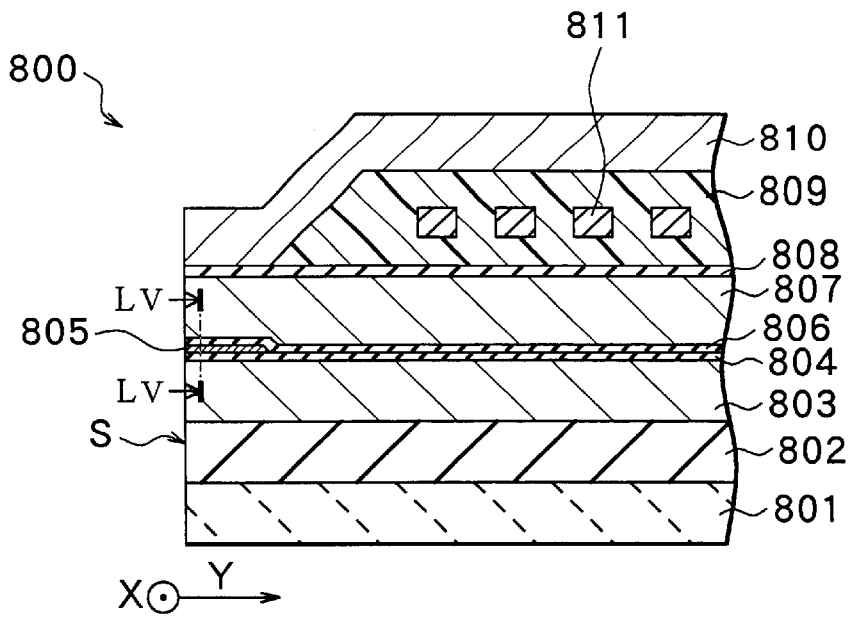
FIG. 54 is a cross sectional view of a sectional structure of a conventional thin film magnetic head.
Figure 55:
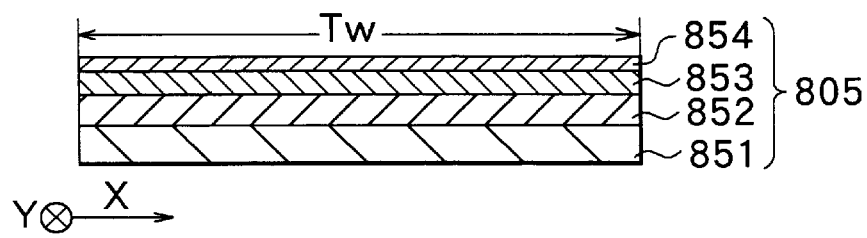
FIG. 55 is a cross sectional view of an MR element of the thin film magnetic head shown in FIG. 54, showing a sectional structure parallel to the medium facing surface.
Figure 56:
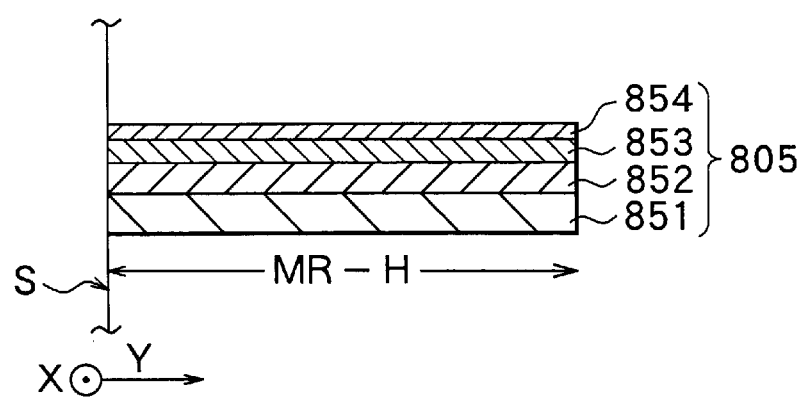
FIG. 56 is a cross sectional view of the MR element of the thin film magnetic head shown in FIG. 54, showing a sectional structure perpendicular to the medium facing surface.

FIGS. 52 and 53 show a method of manufacturing the MR element 700 of the embodiment. As shown in FIG. 52, the insulating layer 2, the bottom shield layer 3 and the bottom shield gap layer 4 are stacked on the substrate 1 through the same steps as the steps of the third embodiment. Then, nonmagnetic metal of high resistance containing any one element of Zr, Bi, Ta, Pt and Pd is deposited with a thickness of 1 nm to 100 nm on the bottom shield gap layer 4 by sputtering, whereby a heat dissipation layer forming film 706 for forming the heat dissipation layer 760 is formed. Then, a stacked film 705 for forming the stack 750 is formed on the heat dissipation layer forming film 706. The stacked film 705 has a stacked structure comprising the antiferromagnetic layer 751 made of, for example, PtMn; the pinned layer 752 that is a magnetic layer made of, for example, Co; the nonmagnetic metal layer 753 made of, for example, Cu; the free layer 754 made of, for example, NiFe; and the protective layer 758 made of, for example, Ta.

Then, as shown in FIG. 53, a photoresist pattern 705a is formed on the stacked film 705 at a position where the stack 750 is to be formed. The stacked film 705 is obliquely etched by means of ion milling using, for example, Ar ions or the like by using the photoresist pattern 705a as a mask, whereby the tapered surface 750A is formed on the side opposite to the medium facing surface S. An inclination of the tapered surface 750A can be controlled by the angle α of incidence of ions and the thickness t of the photoresist pattern 705a. The angle α of incidence of ions is adjusted within a range of from 10 degrees to 60 degrees, and the thickness t of the photoresist pattern 705a is adjusted within a range of from 0.5 μm to 5.0 μm. For example, when the angle α of incidence of ions is 10 degrees and the thickness t of the photoresist pattern 705a is 3 μm, the taper angle θ of the tapered surface 750A is 15 degrees. After that, the thin film magnetic head is completed through the same steps as the steps of the third embodiment shown in FIG. 29 to FIGS. 34A and 34B.

The MR element configured as described above achieves the following effect. That is, detection of the magnetic field is performed in accordance with a variation in the orientation of magnetization of the free layer 754, and therefore only the free layer 754 can be reduced in size in order to adapt to the increase in the density of the magnetic recording medium. In the embodiment, the respective areas of the antiferromagnetic layer 751 and the heat dissipation layer 760 are larger than the area of the free layer 754. Even if the free layer 754 is reduced in size, the heat dissipation area can be therefore ensured by the antiferromagnetic layer 751 and the heat dissipation layer 760. In other words, the efficiency of heat dissipation of the MR element can be improved while adapting to high-density recording.

An insulating layer such as the insulating layer of the fourth embodiment may be provided between the antiferromagnetic layer 751 and the heat dissipation layer 760 of the stack 750 of the MR element of the seventh embodiment.

Although the invention has been described above by referring to some embodiments, the invention is not limited to these embodiments and various modifications of the invention are possible. For example, a stepped layer structure shown in FIG. 22 may be applied to the stack of the MR element according to any one of the third to seventh embodiments. Moreover, as the film for applying the bias magnetic field, a biasing ferromagnetic film and a biasing antiferromagnetic film may be replaced with a hard magnetic film (hard magnet). Moreover, the free layer and the pinned layer may be each made of a stacked film comprising a plurality of layers. Furthermore, the layers of the stack may be stacked in reverse order: the free layer, the nonmagnetic metal layer, the pinned layer and the antiferromagnetic layer may be stacked in this order on the substrate. Moreover, the recording head and the reproducing head may be stacked in reverse order.

Moreover, the stack of each of the above-mentioned embodiments may be made of an AMR film or a tunnel junction type magnetoresistive film (TMR film). Moreover, the MR element of each of the above-mentioned embodiments may comprise an element using an AMR film or an element using a TMR film. In the above-mentioned embodiments, the description has been given with regard to the case where the magnetic transducer of the invention is used in a composite thin film magnetic head. However, the magnetic transducer of the invention can be also used in a thin film magnetic head for reproducing only. Furthermore, the magnetic transducer of the invention can be applied to, for example, a sensor for sensing a magnetic signal, a memory for storing a magnetic signal, or the like, as well as the thin film magnetic head described by referring to the above-mentioned embodiments.

As described above, according to a magnetic transducer, a thin film magnetic head, a method of manufacturing a magnetic transducer or a method of manufacturing a thin film magnetic head of first aspect of the invention, the distance between one end surface of the antiferromagnetic layer (the surface facing the external magnetic field) and the opposite face is longer than the distance between one end face of the soft magnetic layer (the surface facing the external magnetic field) and the opposite face. Thus, the area of the antiferromagnetic layer is larger than the area of the soft magnetic layer. Therefore, the effect of improving the efficiency of heat dissipation is achieved. Furthermore, even if the soft magnetic layer is reduced in size, the heat dissipation area can be ensured by the antiferromagnetic layer. Therefore, the efficiency of heat dissipation of the magnetic transducer can be improved while adapting to high-density recording.

More particularly, according to the magnetic transducer of the first aspect of the invention, a difference between the distance between the one end surface of the antiferromagnetic layer (the surface facing the external magnetic field) and the opposite face and the distance between the one end face of the soft magnetic layer (the surface facing the external magnetic field) and the opposite face is set to from 0.05 µm to 1.0 µm inclusive. Therefore, it is possible to ensure that the heat dissipation effect is obtained and to obtain symmetry of the plus output and the minus output.

According to a magnetic transducer, a thin film magnetic head, a method of manufacturing a magnetic transducer or a method of manufacturing a thin film magnetic head of second aspect of the invention, the heat dissipation layer adjacent to the magneto-sensitive layer of the magnetic transducer is provided. Thus, heat generated in the magneto-sensitive layer is dissipated to the outside through the heat dissipation layer. As a result, the effect of improving the efficiency of heat dissipation is obtained.

More particularly, according to the magnetic transducer of the second aspect of the invention, the thickness of the heat dissipation layer is from 1 nm to 100 nm inclusive. Therefore, it is possible to ensure that the heat dissipation effect is obtained. Also, the asymmetry of the plus output and the minus output can be within acceptable limits.

According to a magnetic transducer of another aspect of the invention, the heat dissipation layer is made of a material having higher resistance than resistance of the stack. Thus, the diversion of the sense current to the heat dissipation layer is prevented. Therefore, unnecessary power consumption is reduced.

According to a magnetic transducer of still another aspect of the invention, the surface area of the heat dissipation layer is larger than that of the stack. Even if the stack is reduced in size in order to adapt to the increase in the recording density, the surface area of the heat dissipation layer required for heat dissipation can be therefore ensured.

According to a magnetic transducer of a still another aspect of the invention, the insulating layer is provided between the stack and the heat dissipation layer. Thus, the diversion of the sense current to the heat dissipation layer is prevented. Therefore, unnecessary power consumption is reduced.

Obviously many modifications and variations of the present invention are possible in the light of the above teachings. It is therefore to be understood that within the scope of the appended claims the invention may be practiced otherwise than as specifically described.

What is claimed is:

1. A magnetic transducer comprising:
   a nonmagnetic layer;
   a soft magnetic layer formed adjacent to one surface of the nonmagnetic layer;
   a ferromagnetic layer formed adjacent to the other surface of the nonmagnetic layer; and
   an antiferromagnetic layer formed adjacent to a surface of the ferromagnetic layer, the surface being opposite to a surface in contact with the nonmagnetic layer,
   wherein the soft magnetic layer, the nonmagnetic layer, the ferromagnetic layer and the antiferromagnetic layer are configured so that one end face thereof forms a surface facing an external magnetic field, and
   a distance between the one end face of the antiferromagnetic layer and the opposite face is longer than at least a distance between the one end face of the soft magnetic layer and the opposite face.

2. A magnetic transducer according to claim 1, wherein a difference between the distance from the one end face of the antiferromagnetic layer to the opposite face and the distance from the one end face of the soft magnetic layer to the opposite face is from 0.05 µm to 1.0 µm inclusive.

3. A magnetic transducer according to claim 1, wherein the face opposite to the one end face of the soft magnetic layer, the nonmagnetic layer, the ferromagnetic layer and the antiferromagnetic layer is inclined to the one end face.

4. A magnetic transducer according to claim 1, wherein the face opposite to the one end face of the soft magnetic layer is parallel to the one end face, and
   the face opposite to the one end face of the nonmagnetic layer, the ferromagnetic layer and the antiferromagnetic layer is inclined to the one end face.

5. A magnetic transducer according to claim 1, wherein a protective layer is formed on a surface of the soft magnetic layer, the surface being opposite to a surface in contact with the nonmagnetic layer.

6. A thin film magnetic head comprising a magnetic transducer located facing a recording medium,
   the magnetic transducer including:
   a nonmagnetic layer;
   a soft magnetic layer formed adjacent to one surface of the nonmagnetic layer;
   a ferromagnetic layer formed adjacent to the other surface of the nonmagnetic layer; and
   an antiferromagnetic layer formed adjacent to a surface of the ferromagnetic layer, the surface being opposite to a surface in contact with the nonmagnetic layer,
   wherein the soft magnetic layer, the nonmagnetic layer, the ferromagnetic layer and the antiferromagnetic layer are configured so that one end face thereof forms a surface facing the recording medium, and
   a distance from the one end face of the antiferromagnetic layer to the opposite face is longer than at least a distance from the one end face of the soft magnetic layer to the opposite face.

7. A thin film magnetic head according to claim 6, wherein a difference between the distance from the one end face of the antiferromagnetic layer to the opposite face and the distance from the one end face of the soft magnetic layer to the opposite face is from 0.05 µm to 1.0 µm inclusive.

8. A thin film magnetic head according to claim 6, wherein the surface opposite to the one end face of the soft magnetic layer, the nonmagnetic layer, the ferromagnetic layer and the antiferromagnetic layer is inclined to the one end surface.

9. A thin film magnetic head according to claim 6, wherein the surface opposite to the one end face of the soft magnetic layer is parallel to the one end face, and the surface opposite to the one end face of the nonmagnetic layer, the ferromagnetic layer and the antiferromagnetic layer is inclined to the one end face.

10. A thin film magnetic head according to claim 6 further comprising:

two magnetic shield layers located so as to face each other with the magnetic transducer in between, for magnetically shielding the magnetic transducer.

11. A thin film magnetic head according to claim 6 further comprising:

an inductive magnetic transducer having:

two magnetic layers magnetically coupled to each other and each having a recording-medium-facing part including a magnetic pole, the magnetic poles facing each other with a gap layer in between, the magnetic layers being each formed of at least one layer; and thin film coils arranged between the two magnetic layers.

* * * * *